US007971106B2

(12) United States Patent
Lovy et al.

(10) Patent No.: US 7,971,106 B2
(45) Date of Patent: *Jun. 28, 2011

(54) METHOD AND APPARATUS FOR MAINTAINING THE STATUS OF OBJECTS IN COMPUTER NETWORKS USING VIRTUAL STATE MACHINES

(75) Inventors: David M. Lovy, Blossvale, NY (US);
Brant M. Fagan, LaFayette, NY (US);
Robert J. Bojanek, Rome, NY (US)

(73) Assignee: ShoreGroup, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/409,633

(22) Filed: Mar. 24, 2009

(65) Prior Publication Data

US 2009/0216881 A1 Aug. 27, 2009

Related U.S. Application Data

(63) Continuation of application No. 11/937,798, filed on Nov. 9, 2007, now Pat. No. 7,509,540, which is a continuation of application No. 10/919,887, filed on Aug. 17, 2004, now Pat. No. 7,296,194, which is a continuation of application No. 10/109,481, filed on Mar. 28, 2002, now Pat. No. 7,197,561.

(60) Provisional application No. 60/279,397, filed on Mar. 28, 2001.

(51) Int. Cl.
*G06F 11/00* (2006.01)

(52) U.S. Cl. ............................................. 714/57; 714/47

(58) Field of Classification Search .................... 714/43, 714/47, 57; 709/224
See application file for complete search history.

(56) References Cited

U.S. PATENT DOCUMENTS

| 5,483,631 | A | * | 1/1996 | Nagai et al. | 715/736 |
|---|---|---|---|---|---|
| 5,504,921 | A | * | 4/1996 | Dev et al. | 709/223 |
| 5,655,081 | A | * | 8/1997 | Bonnell et al. | 709/202 |
| 5,819,028 | A | * | 10/1998 | Manghirmalani et al. | 714/57 |
| 5,828,830 | A | * | 10/1998 | Rangaraian et al. | 714/48 |
| 6,012,152 | A | * | 1/2000 | Douik et al. | 714/26 |
| 6,138,171 | A | * | 10/2000 | Walker | 719/318 |
| 6,148,337 | A | * | 11/2000 | Estberg et al. | 709/224 |
| 6,182,249 | B1 | * | 1/2001 | Wookey et al. | 714/47 |
| 6,269,330 | B1 | * | 7/2001 | Cidon et al. | 714/43 |
| 6,330,600 | B1 | * | 12/2001 | Matchefts et al. | 709/223 |

(Continued)

*Primary Examiner* — Joshua A Lohn
(74) *Attorney, Agent, or Firm* — Burns & Levinson LLP; Bruce D. Jobse, Esq.

(57) ABSTRACT

A network appliance for monitoring, diagnosing and documenting problems among a plurality of devices and processes (objects) coupled to a computer network utilizes periodic polling and collection of object-generated trap data to monitor the status of objects on the computer network. The status of a multitude of objects is maintained in memory utilizing virtual state machines which contain a small amount of persistent data but which are modeled after one of a plurality of finite state machines. The memory further maintains dependency data related to each object which identifies parent/child relationships with other objects at the same or different layers of the OSI network protocol model. A decision engine verifies through on-demand polling that a device is down. A root cause analysis module utilizes status and dependency data to locate the highest object in the parent/child relationship tree that is affected to determine the root cause of a problem. Once a problem has been verified, a "case" is opened and notification alerts may be sent out to one or more devices. A user interface allows all objects within the network to be displayed with their respective status and their respective parent/child dependency objects in various formats.

8 Claims, 22 Drawing Sheets

U.S. PATENT DOCUMENTS

| | | | |
|---|---|---|---|
| 6,453,254 B1 * | 9/2002 | Bullwinkel et al. | 702/81 |
| 6,477,667 B1 * | 11/2002 | Levi et al. | 714/57 |
| 6,553,515 B1 * | 4/2003 | Gross et al. | 714/47 |
| 6,704,030 B1 * | 3/2004 | McDonald et al. | 715/736 |
| 6,871,324 B2 * | 3/2005 | Hand et al. | 715/734 |
| 7,225,117 B1 * | 5/2007 | Feldstein et al. | 703/21 |
| 7,284,048 B2 * | 10/2007 | Jakobson et al. | 709/224 |
| 2002/0138785 A1 * | 9/2002 | Hammond et al. | 714/14 |
| 2002/0140725 A1 * | 10/2002 | Horii | 345/736 |
| 2003/0084146 A1 * | 5/2003 | Schilling et al. | 709/224 |
| 2003/0088665 A1 * | 5/2003 | Sauermann | 709/224 |

* cited by examiner

METHOD AND APPARATUS FOR MAINTAINING THE STATUS OF OBJECTS IN COMPUTER NETWORKS USING VIRTUAL STATE MACHINES

This patent application is a continuation of U.S. patent application Ser. No. 11/937,798, filed Nov. 9, 2007, now U.S. Pat. No. 7,509,540, which is a continuation of U.S. patent application Ser. No. 10/919,887, filed Aug. 17, 2004, now U.S. Pat. No. 7,296,194 which is a continuation of U.S. patent application Ser. No. 10/109,481, filed Mar. 28, 2002, now U.S. Pat. No. 7,197,561, which claims the benefit of U.S. Provisional Patent Application No. 60/279,397 filed Mar. 28, 2001, all of which are incorporated herein by reference in their entirety.

FIELD OF THE INVENTION

This invention relates generally to computer networks and more specifically, to an apparatus and methods for identifying, diagnosing, and documenting problems in computer networks including networking devices, servers, appliances, and network services collectively known as objects.

BACKGROUND OF THE INVENTION

Much prior art has focused on identifying network and/or system fault conditions. Additionally, prior art has used topological network maps and diagnostic tools to display network fault conditions. Such tools have been designed to allow less skilled network administrators to conduct support from a network or system management station. Occasionally, network and/or system management systems interface with an exterior system for the documentation of problems and resolutions. Integration is often problematic requiring extensive manipulation and correlation of alarm conditions prior to problem and problem resolution documentation.

Such a traditional approach is inefficient on several levels. The traditional model assumes an administrator is available to actively monitor the network or system management station. In an environment where adequately trained human resources are unavailable, an administrator dedicated to monitoring the network management system is a luxury many technical staffs do not have. A successful system must therefore identify a fault condition and have an established methodology of contacting the appropriate personnel when a fault condition exists.

The current paradigm for network and system management systems is to represent fault information via a topological map. Typically a change in color (or other visual cue) represents a change in the condition of the network or system. This method, as currently applied, is appropriate when a single layer of the Open Systems Interconnect (OSI) logical hierarchical architecture model can represent the fault condition. For example, a fault condition associated with layer two devices can be adequately represented by a layer two topological map. However, to maintain the current paradigm of representing fault condition topologically, a topology map should present a view of the network consistent with complex multi-layer dependencies. Topological representations of large networks are also problematic. A large network is either squeezed onto a single screen or the operator must zoom in and out of the network to change the view. This common approach ignores known relationships between up and downstream objects in favor of a percentage view of the network, e.g. 100% equals the entire network, 50% equals one-half the network.

Further, adequate documentation and description of a problem or fault conditions and its corresponding resolution is essential but difficult to achieve within the confines of a current network or system management systems. Typically the problem description and problem resolution are documented external to the network or system management system. As a result of using an external system to document problems and their resolution, a dichotomy is created between the machine events in the network management system and the external system which records human intervention. Furthermore, the network management system will typically generate multiple events for a single object, such association often lost when translated to an external system. Reconciling the machine view of the network management system with that of the external system documenting the problem description/problem resolution is quite often difficult and unsuccessful.

Current network management tools depend upon the discovery of network/system devices associated with the network, typically through discovery of devices at layer two of the OSI model. Thereafter the network is actively rediscovered using the tool to maintain a current view of the network or system.

A need exists for a technique to topologically represent complex multi-layer relationships between managed objects including complex dependencies between objects operating at multiple layers of the OSI model.

A need exists for a technique to discover, maintain and document the current state of the network based on known network/system objects and to detect deviations from the known state of the network and report such discovered deviations as faults.

SUMMARY OF THE INVENTION

The invention discloses a network management appliance and methods for identifying, diagnosing, and documenting problems in computer networks using the appliance. The devices and process available on a network, as well as grouping of the same, are collectively referred to hereafter as "objects". Accordingly, a monitored or managed object may be physical device(s), process (es) or logical associations or the same. The network appliance comprises one or more a polling modules, a decision engine, a database, case management module including a user interface. The network appliance monitors objects throughout the network and communicates their status and/or problems to any number of receiving devices including worldwide web processes, e-mail processes, other computers, PSTN or IP based telephones or pagers.

The Status Poller periodically polls one or more monitored network objects and receives fault responses thereto. The Trap Receiver receives device generated fault messages. Both the Trap Receiver and Status Poller generate and transmit decision requests to the decision engine. The decision engine interacts with the database and the case management module to monitor the status of problems or "cases" which have been opened. The case management module interacts with the various notification devices to provide the status updates and to provide responses to queries.

The status of a monitored object is maintained in memory using a virtual state machine. The virtual state machines are based on one or a plurality of different finite state machine models. The decision engine receives input data, typically event messages, and updates the virtual state machines accordingly. The inventive network appliance records thousands of network states and simultaneously executes thousands of state machines while maintaining a historical record of all states and state machines.

According to a first aspect of the present invention, In a computer system having a processor, memory and a network interface, an apparatus for monitoring a plurality of device or process objects operatively coupled to the computer system over a computer network, the apparatus comprising (a) means for monitoring the status of the plurality of monitored objects over the computer network, (b) a memory for storing a plurality of different finite state machine models, each finite state machine model comprising (i) a finite set of states, only one of the states being active at a time and referred to as the current state, (ii) a finite set of input events that trigger state changes and execution of actions, (iii) a finite set of transitions, each of which, given a current state and a specific input event, cause a transition of the finite state machine model to a next state, and (iv) a set of actions associated with selected of the finite states; (c) the memory for further storing a virtual state machine associated with each of the plurality of monitored objects, each virtual state machine comprising (i) data identifying the monitored object, (ii) data identifying one of the plurality of finite state machine models, and (iii) data identifying one of the finite states of the identified finite state machine model as a current state of the virtual state machine; and (d) a decision engine, coupled to the means for monitoring and the memory, for receiving input event data relating to one of the monitored objects and for accessing the virtual state machine in memory associated with said one monitored object, the decision engine further configured to manipulate the data identifying the current state of the virtual state machine associated with said one monitored object and for determining which actions associated with the identified finite state machine model should be performed.

According to a second aspect of the present invention, in an apparatus operatively coupled over a computer network to a plurality of device or process objects, a method comprising (a) storing in a memory a plurality of different finite state machine models, each finite state machine model comprising (i) a finite set of states, only one of the states being active at a time and referred to as the current state, (ii) a finite set of input events that trigger state changes and execution of actions, and (iii) a finite set of transitions, each of which, given a current state and a specific input event, cause a transition of the finite state machine model to a next state, (iv) a set of actions associated with one of the states; (b) further storing in the memory a virtual state machine associated with each of the plurality of monitored objects, each virtual state machine comprising (i) data identifying the monitored object, (ii) data identifying one of the plurality of finite state machine models, and (iii) data identifying one of the finite states of the identified finite state machine model as a current state of the virtual state machine; (c) monitoring the status of the plurality of monitored objects over the computer network; (d) receiving input event data relating to one of the monitored objects; (e) accessing the virtual state machine in memory associated with said one monitored object; (f) manipulating the data identifying a current state of the virtual state machine associated with said one monitored object; and (g) executing the actions associated with the identified finite state machine model.

According to a third aspect of the present invention, a memory for storing data to be processed by a data processing system including an apparatus for monitoring a plurality of device or process objects operatively coupled to a data processing system over a computer network, the memory comprising a data structure stored in the memory and usable to maintain a virtual finite state machine associated with one of the monitored objects, the data structure comprising (a) data identifying said one monitored object; (b) data identifying one of a plurality of different finite state machine models, each finite state machine model comprising (i) a finite set of states, only one of the states being active at a time and referred to as a current state, (ii) a finite set of input events that trigger state changes and execution of actions, (iii) a finite set of transitions, each of which, given a current state and a specific input event, cause a transition of the finite state machine model to a next state, and (iv) a set of actions associated with selected of the finite states; (c) data identifying one of the finite states of the identified finite state machine model as a current state of the virtual state machine.

According to a fourth aspect of the present invention, in a computer system having a processor, memory and a network interface, an apparatus for monitoring a plurality of device or process objects operatively coupled to the computer system over a computer network, the apparatus comprising (a) a poller for sending queries to the plurality of monitored objects and for receiving responses therefrom; (b) a trap receiver for receiving traps generated by the monitored objects; (c) a decision engine responsive to decision requests from any of the trap receiver and poller, the decision engine further configured to send a verification query to one of the plurality of monitored objects identified in the decision request and for a receiving response to the verification query; (d) a memory for storing a plurality of different finite state machine models, each finite state machine model comprising finite set of states, only one of the states being active at a time and referred to as the current state; (e) the memory further storing a virtual state machine for each of the monitored objects, each virtual state machine comprising: (i) data identifying the monitored object, (ii) data identifying one of the plurality of finite state machine models, and (iii) data identifying one of the finite states of the identified finite state machine model as a current state of the virtual state machine; and (f) a case management module for receiving requests from the decision engine to open a case related to a monitored object.

BRIEF DESCRIPTION OF THE DRAWINGS

The above and further advantages of the invention may be better understood by referring to the following description in conjunction with the accompanying drawings in which.

DETAILED DESCRIPTION

Figure 1:
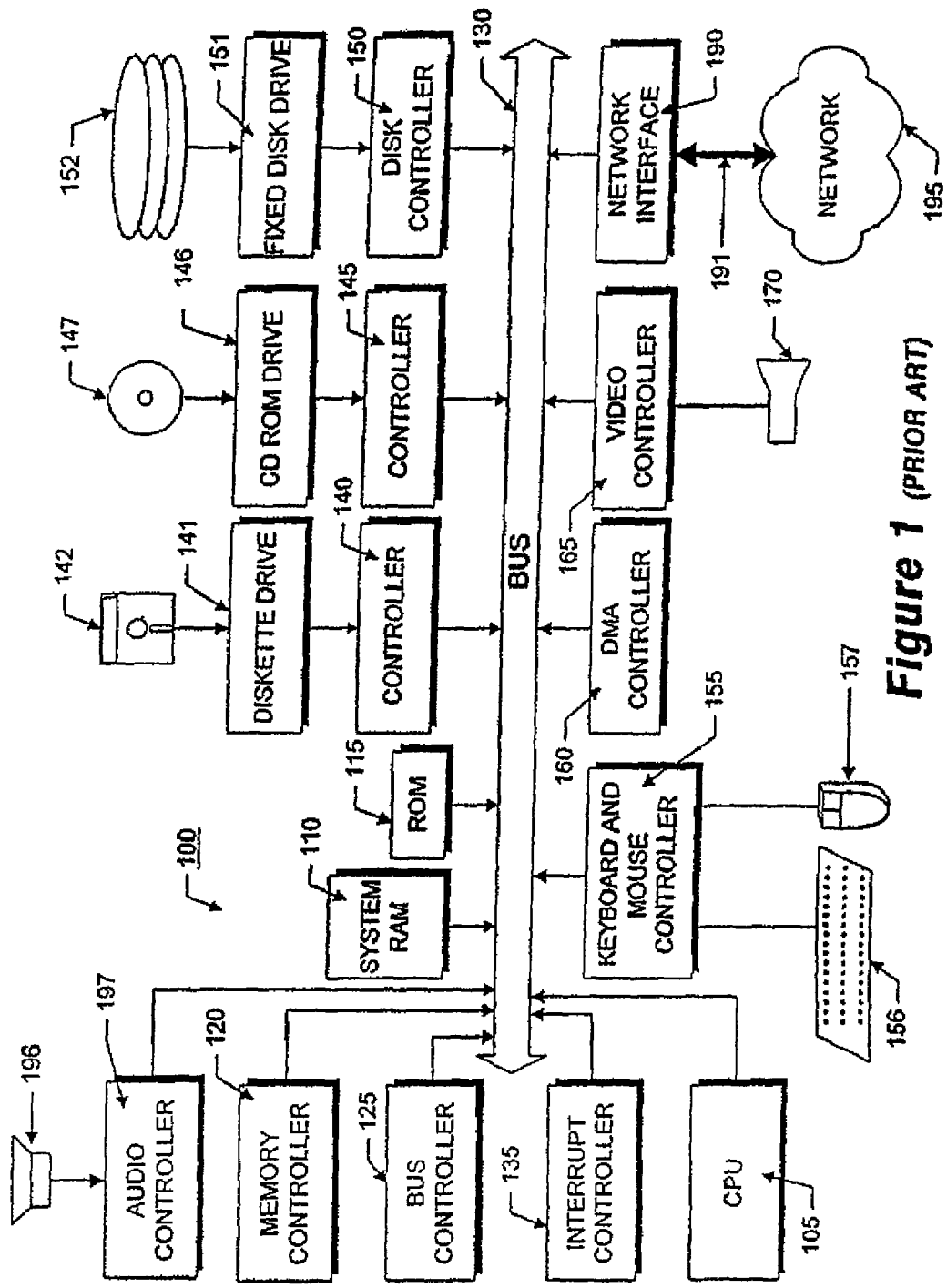
FIG. 1 is a block diagram of a prior art computer system suitable for use with the present invention.

FIG. 1 illustrates the system architecture for a computer system 100, such as a Dell Dimension 8200, commercially available from Dell Computer, Dallas Tex., on which the invention can be implemented. The exemplary computer system of FIG. 1 is for descriptive purposes only. Although the description below may refer to terms commonly used in describing particular computer systems, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DMA controller 160 is provided for performing direct memory access to system RAM 110. A visual display is generated by video controller 165 which controls video display 170. Computer system 100 also includes a network adapter 190 which allows the system to be interconnected to a local area network (LAN) or a wide area network (WAN), schematically illustrated by bus 191 and network 195.

Computer system 100-102 are generally controlled and coordinated by operating system software. The operating system controls allocation of system resources and performs tasks such as process scheduling, memory management, and networking and I/O services, among other things. In particular, an operating system resident in system memory and running on CPU 105 coordinates the operation of the other elements of computer system 100. The present invention may be implemented with any number of commercially available operating systems including UNIX, Windows NT, Windows 2000, Windows XP, Linux, Solaris, etc. One or more applications 220 such as the inventive network management application may execute under control of the operating system 210. If operating system 210 is a true multitasking operating system, multiple applications may execute simultaneously.

In the illustrative embodiment, the present invention may be implemented using object-oriented technology and an operating system which supports execution of object-oriented programs. For example, the inventive system may be implemented using a combination of languages such as C, C++, Perl, PHP, Java, HTML, etc., as well as other object-oriented standards.

In the illustrative embodiment, the elements of the system are implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein. The program code used to implement the present invention may also be written in scripting languages such as Perl, Java Scripts, or non-compiled PHP. If required, the non-compiled PHP can be converted to machine readable format.

Network Communication Environment

Figure 2:
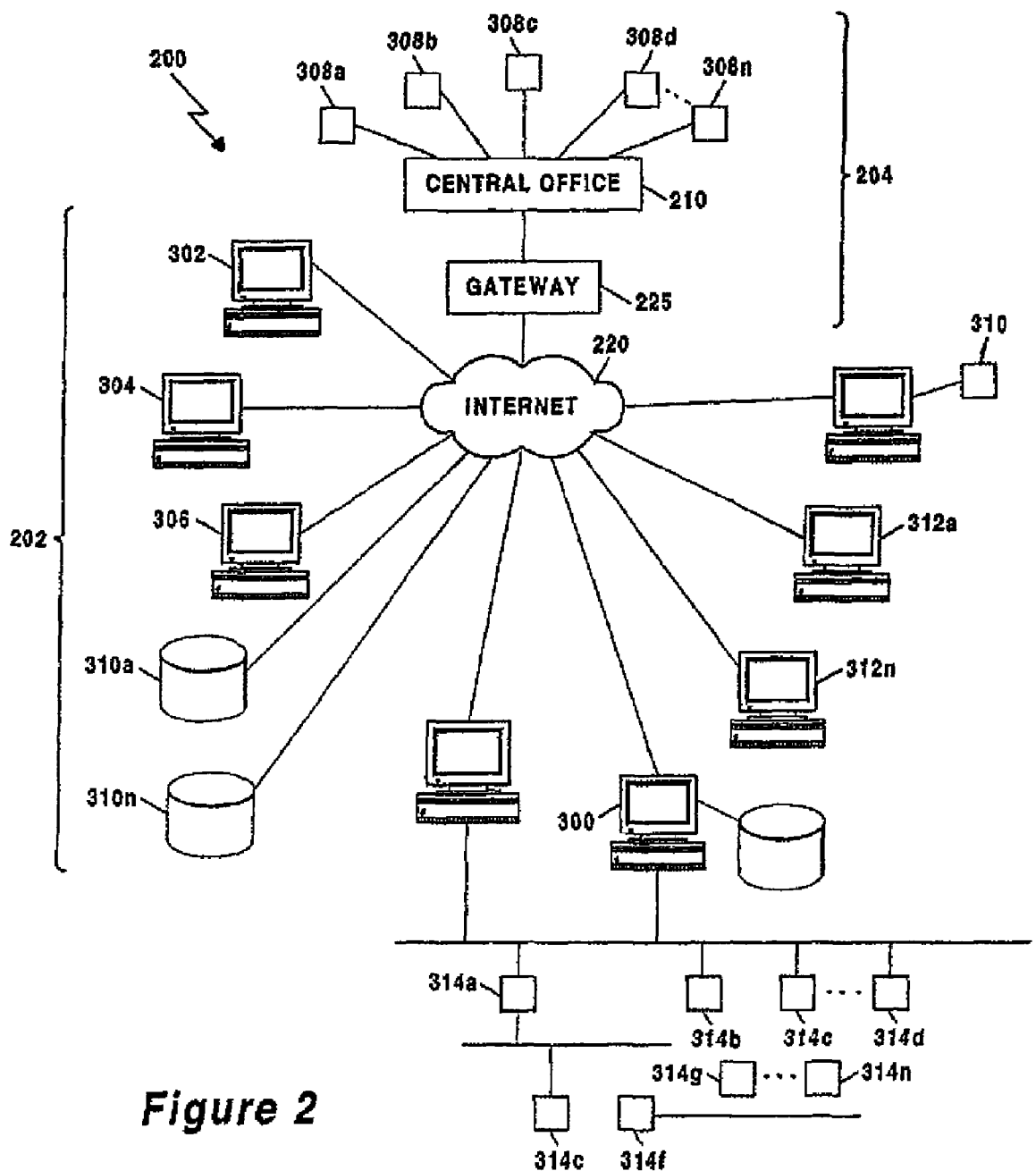
FIG. 2 is a conceptual illustration of a network environment in which the present invention may be utilized.

FIG. 2 illustrates a telecommunications environment in which the invention may be practiced such environment being for exemplary purposes only and not to be considered limiting. Network 200 of FIG. 2 illustrates a hybrid telecommunication environment including both a traditional public switched telephone network as well as packet-switched data network, such as the Internet and Intranet networks and apparatus bridging between the two. The elements illustrated in FIG. 2 are to facilitate an understanding of the invention. Not every element illustrated in FIG. 2 or described herein is necessary for the implementation or the operation of the invention.

Specifically, a packet-switched data network 202 comprises a network appliance 300, a plurality of processes 302-306, plurality of monitored devices 314a-n, external databases 310a-n, external services 312 represented by their respective TCP port, and a global network topology 220, illustrated conceptually as a cloud. One or more of the elements coupled to global network topology 220 may be connected directly through a dedicated connection, such as a T1, T2, or T3 connection or through an Internet Service Provider (ISP), such as America On Line, Microsoft Network, Compuserve, etc.

A gateway 225 connects packet-switched data network 202 to circuit switched communications network 204 which includes a central office 210 and one or more traditional telephone terminating apparatus 308a-n. Circuit switched communications network 204 may also include, although not shown, a traditional PSTN toll network with all of the physical elements including PBXs, routers, trunk lines, fiber optic cables, other central offices etc. Terminating apparatus 308a-n may be implemented with either a digital or analog telephone or any other apparatus capable of receiving a call such as modems, facsimile machines, cellular telephones, etc., such apparatus being referred to collectively hereinafter as a terminating apparatus, whether the network actually terminates. Further, the PSTN network may be implemented as either an integrated services digital network (ISDN) or a plain old telephone service (POTS) network.

Each network consists of infrastructure including devices, systems, services and applications. Manageable network components utilize management mechanisms that follow either standard or proprietary protocols. Appliance 300 supports multiple interfaces to manageable devices from various points within its architecture, providing the flexibility to monitor both types of network components.

Components that can be managed using standard or public protocols (including items such as routers, switches, servers, applications, wireless devices, IP telephony processes, etc.) are designed under the premise that such components would reside in networks where a network management system is deployed. Such devices typically contain a MIB (Management Information Base), which is a database of network management information that is used and maintained by a common network management protocol such as SNMP (Simple Network Management Protocol). The value of a MIB object can be retrieved using SNMP commands from the network management system. Appliance 300 monitors the raw status events from such infrastructure directly using various standard protocol queries through a Status Poller 330 and a Trap Receiver 332, as explained hereinafter.

Network components that were not designed with network management applications may have internal diagnostics capabilities that make it possible to generate an alarm or other data log. This data may be available via an interface and/or format that is proprietary in nature. Such systems may also have the ability to generate log files in text format, and make them available through supported interfaces such as e-mail. If event processing capability is needed, appliance 300 can monitor such network components through custom status plug-ins modules.

Network Appliance Overview

Figure 3:
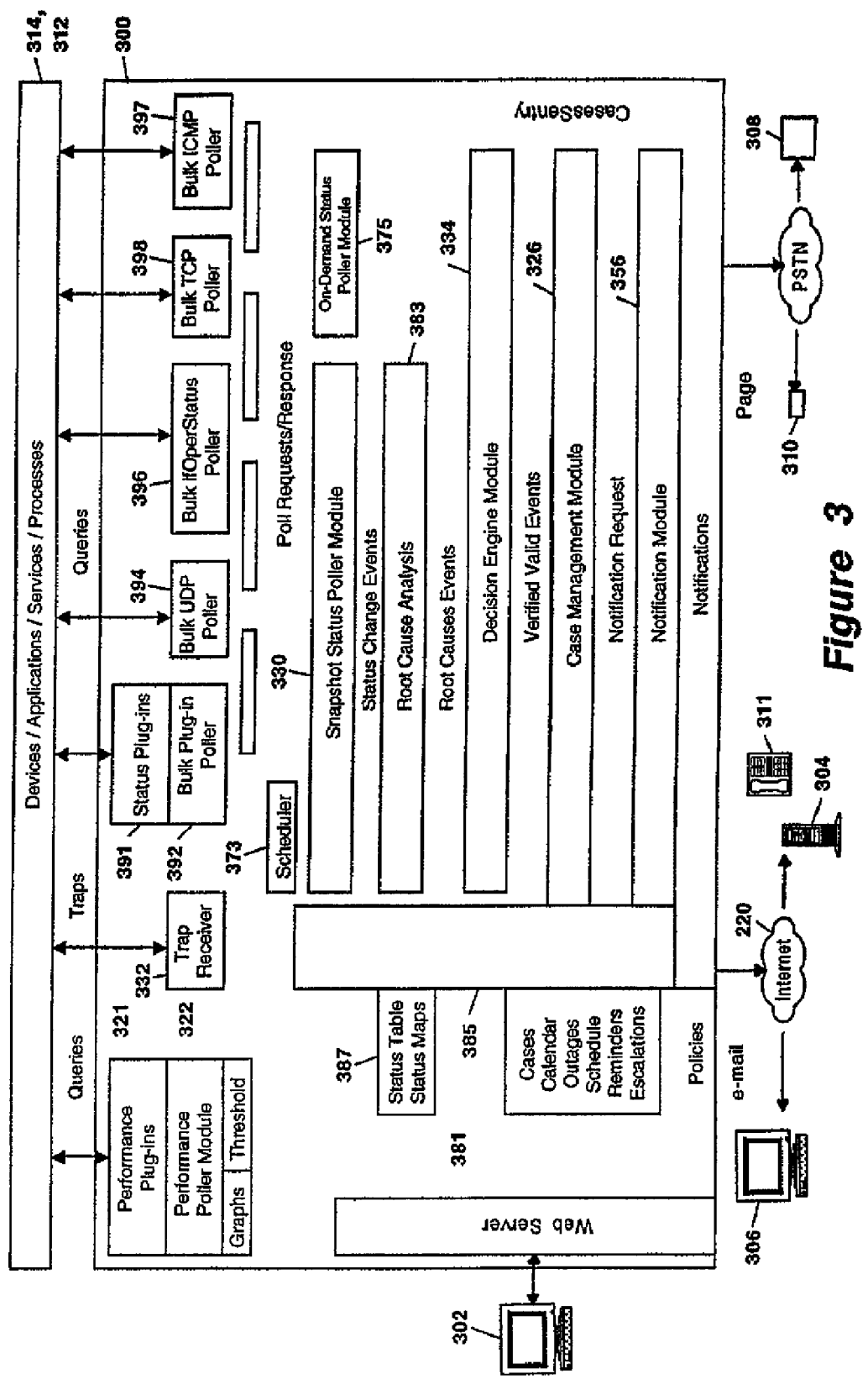
FIG. 3 illustrates conceptually the internal components of the network appliance and external elements within the network environment in accordance with the present invention.
Figure 4:
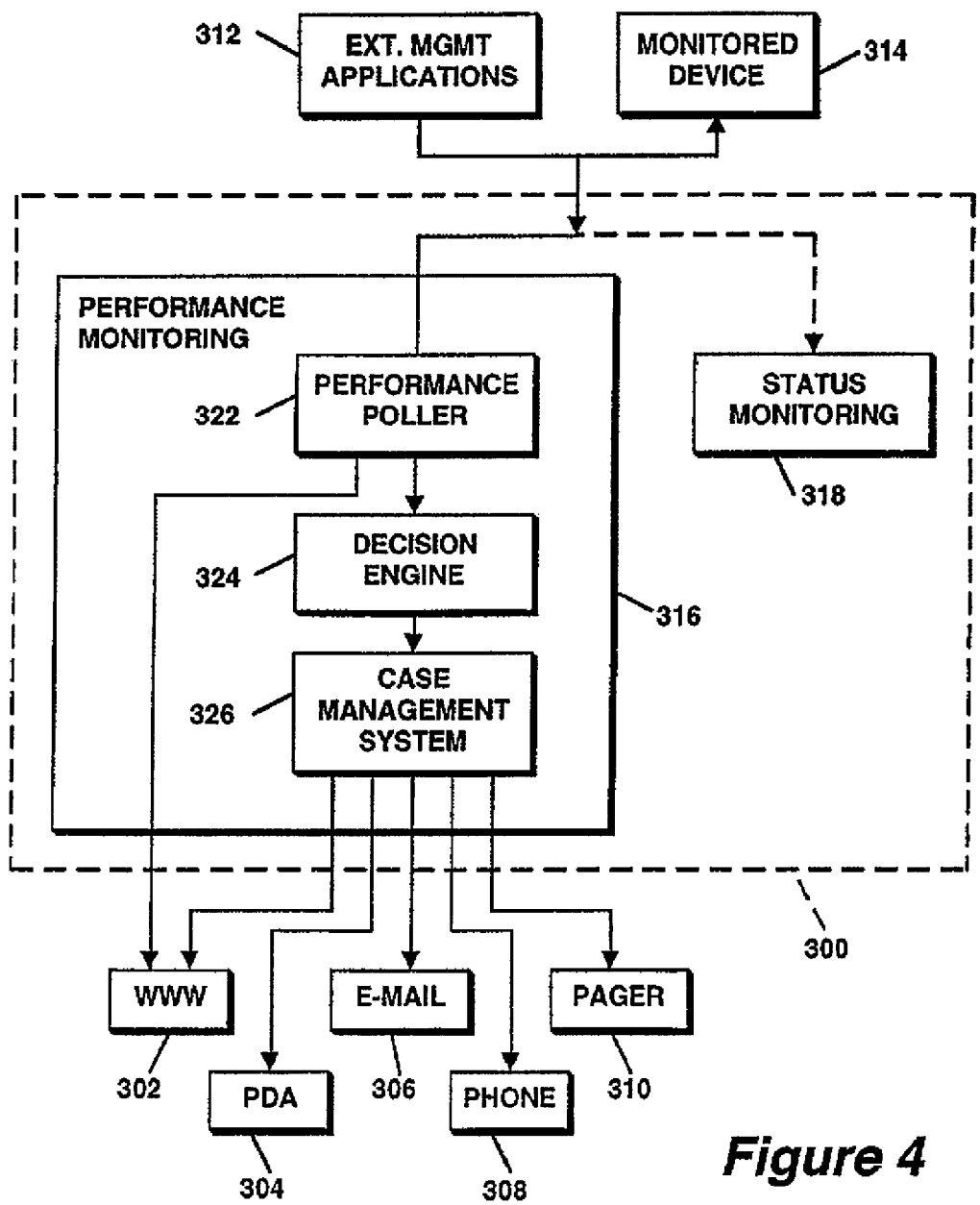
FIG. 4 is a conceptual block diagram of the network management appliance of the present invention illustrating the implementation of the performance monitoring component.
Figure 5:
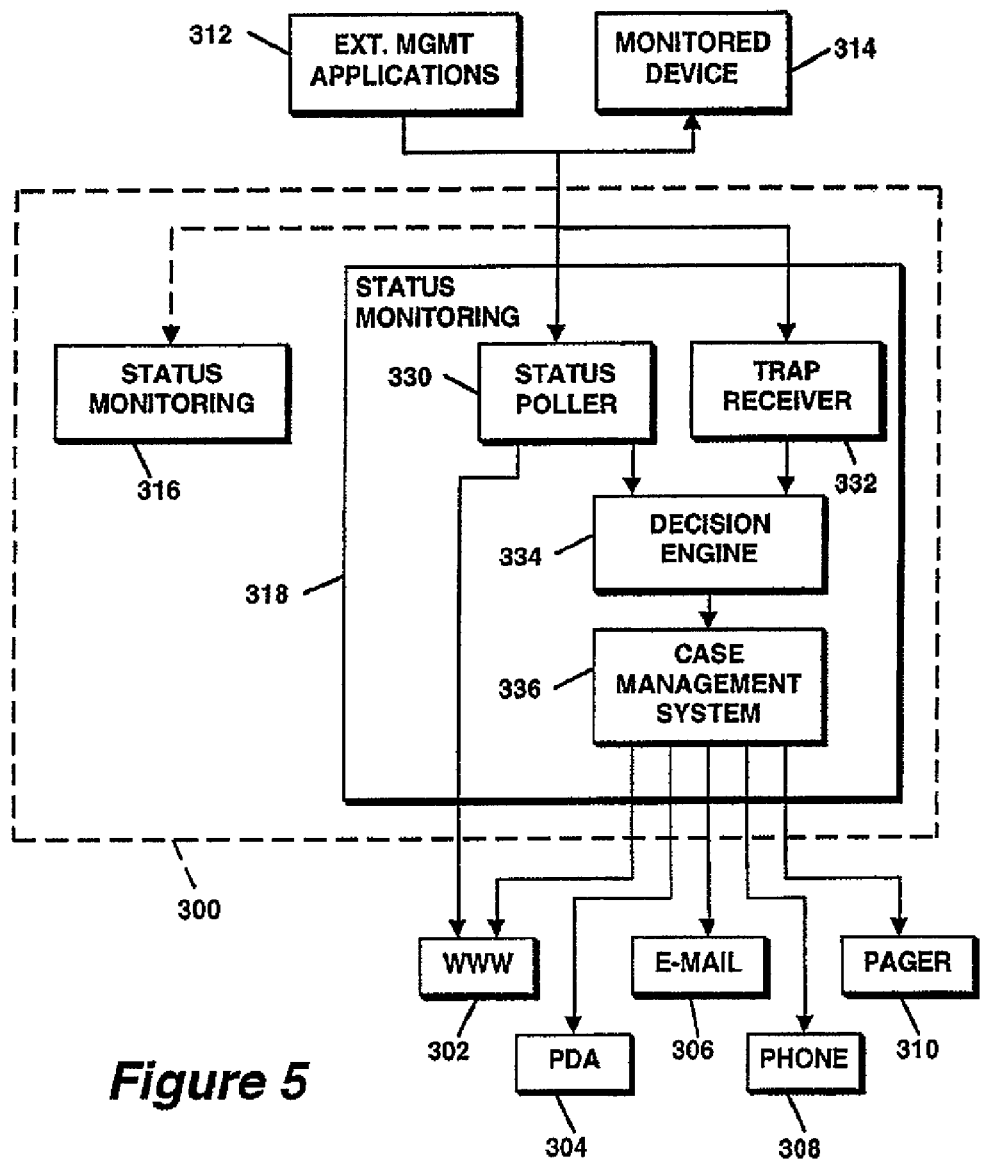
FIG. 5 is a conceptual block diagram of the network management appliance of the present invention illustrating the implementation of the fault monitoring component.

In the illustrative embodiment, except for specific interface hardware, network appliance 300, referred to hereafter as simply as "appliance 300", may be implemented as part of an all software application which executes on a computer architecture similar to that described with reference to FIG. 1. As illustrated in FIGS. 3-5, appliance 300 can communicate either directly or remotely with any number of devices, or processes, including the a worldwide web processes 302, a Personal Digital Assistant 304, an e-mail reader process 306, a telephone 308, e.g., either a traditional PSTN telephone or an IP-enabled telephony process 311, and/or a pager apparatus 310. In addition, appliance 300 can communicate either directly or remotely with any number of external management applications 312 and monitored devices 314. Such communications may occur utilizing the network environment illustrated in FIG. 2 or other respective communication channels as required by the receiving or process.

Appliance 300 monitors network objects, locates the source of problems, and facilitates diagnostics and repair of network infrastructure across the core, edge and access portions of the network. In the illustrative embodiment, appliance 300 comprises a status monitoring module 318, a performance monitoring module 316, a decision engine 324, a case management module 326 and database 348. The implementations of these modules as well as their interaction with each other and with external devices is described hereafter in greater detail.

The present invention uses a priori knowledge of devices to be managed. For example, a list of objects to be monitored may be obtained from Domain Name Server. The desired objects are imported into the appliance 300. The relationships between imported objects may be entered manually or detected via an existing automated process application. In accordance with the paradigm of the invention, any deviation from the imported network configuration is considered a fault condition requiring a modification of the source data. In this manner the network management appliance 300 remains in synchronization with the source data used to establish the network configuration.

Status Monitoring Module

A Status Monitoring Module 318 comprises a collection of processes that perform the activities required to dynamically maintain the network service level, including the ability to quickly identify problems and areas of service degradation. Specifically, Status Monitoring Module 318 comprises Status Poller Module 330, On-Demand Status Poller 335, Status Plug-ins 391, Bulk Plug-In Poller 392, Bulk UDP Poller 394, Bulk if OperStatus Poller 396, Bulk TCP Poller 398, Bulk ICMP Poller 397, Trap Receiver 332, Status View Maintenance Module 385, and Status Maps and Tables Module 387.

Polling and trapping are the two primary methods used by appliance 300 to acquire data about a network's status and health. Polling is the act of asking questions of the monitored objects, i.e., systems, services and applications, and receiving an answer to those questions. The response may include a normal status indication, a warning that indicates the possibility of a problem existing or about to occur, or a critical indication that elements of the network are down and not accessible. The context of the response determines whether further appliance 300 action is necessary. Trapping is the act of listening for a message (or trap) sent by the monitored object to appliance 300. These trap messages contain information regarding the object, its health, and the reason for the trap being sent.

A plurality of plug-ins and pollers provide the comprehensive interface for appliance 300 to query managed objects in a network infrastructure. Such queries result in appliance 300 obtaining raw status data from each network object, which is the first step to determining network status and health. The various plug-ins and pollers operate in parallel, providing a continuous and effective network monitoring mechanism. Pollers may utilize common protocols such as ICMP (Ping), SNMP Get, Telnet, SMTP, FTP, DNS, POP3, HTTP, HTTPS, NNTP, etc. As a network grows in size and complexity, the intelligent application of polling and trapping significantly enhances system scalability and the accuracy of not only event detection, but also event suppression in situations where case generation is not warranted.

Status Poller

Figure 6:
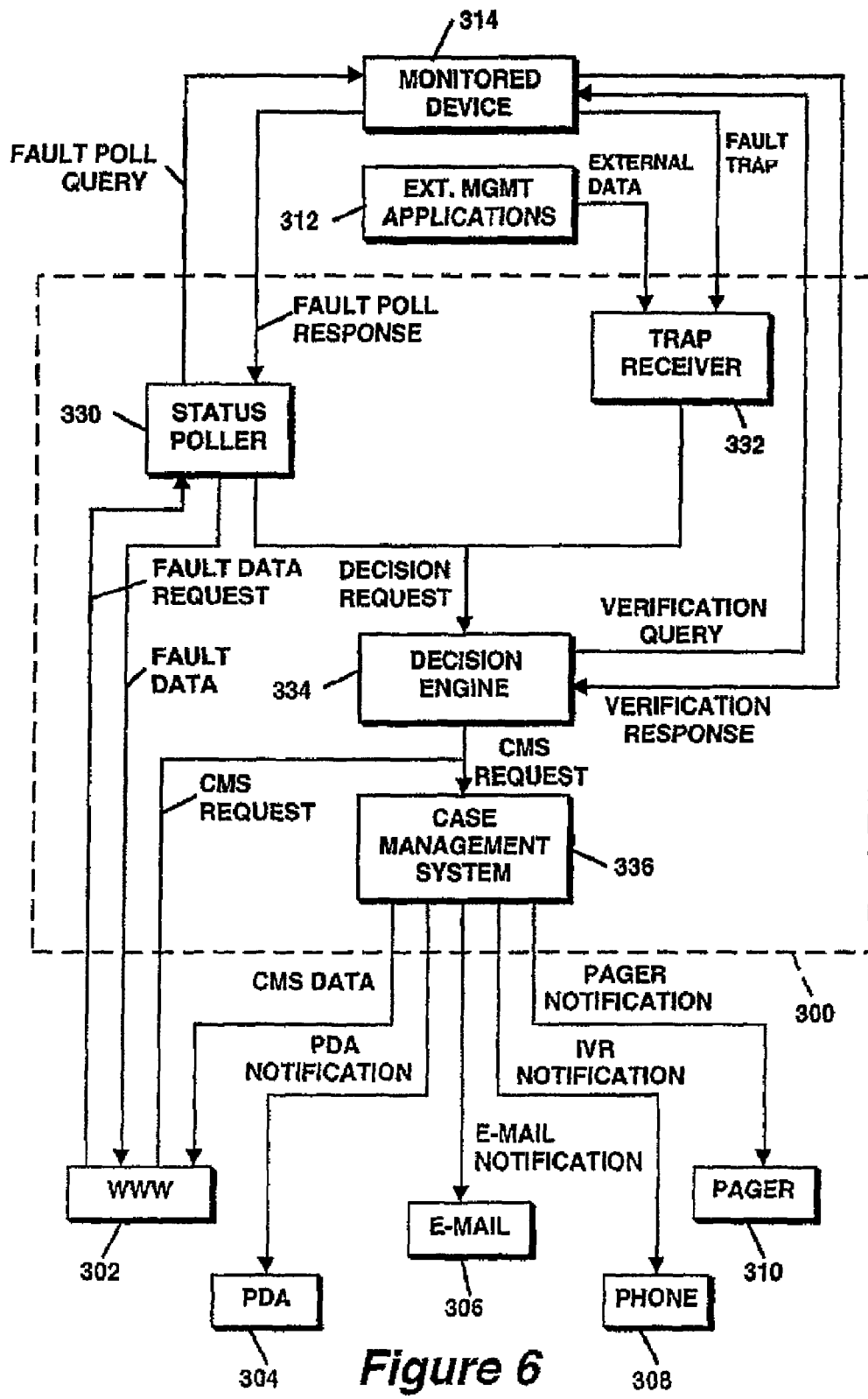
FIG. 6 is a conceptual block diagram illustrating the communication paths between the fault monitoring component of the inventive appliance and the external elements within the network environment.

Fault detection capability in appliance 300 is performed by Status Poller 330 and various poller modules, working to effectively monitor the status of a network. Status Poller 330 controls the activities of the various plug-ins and pollers in obtaining status information from managed devices, systems, and applications on the network. FIG. 6 illustrates the status flow between network appliance 300 and external network elements. Status Poller 330 periodically polls one or more monitored devices 314A-N. Status Poller 330 generates a fault poll query to a monitor device 314 and receives, in return, a fault poll response. The fault poll queries may be in the form of any of a ICMP Echo, SNMP Get, TCP Connect or UDP Query. The fault poll response may be in the form of any of a ICMP Echo Reply, SNMP Response, TCP Ack or UDP Response. Status Poller 330 may also receive a fault data request in URL form from web process 302. In response, Status Poller 330 generates and transmits fault data in HTML format to web process 302. Status Poller 330 generates decision requests for decision engine 334 in the form of messages. In addition, Status Poller 332 receives external data from an external management application 312. Trap Receiver 332 receives device generated fault messages from monitored devices 314. Both Trap Receiver 332 and Status poller 330 generate decision requests for decision engine 334 in the form of messages.

Status Poller 330 determines the needed poll types, segregates managed objects accordingly, and batch polls objects where possible. A Scheduler 373 triggers the Status Poller 330 to request polling at routine intervals. During each polling cycle, each monitored object is polled once. If any objects test critical, all remaining normal objects are immediately polled again. A Dependency Checker module which is part of the Root Cause Analysis Module determines which objects have changed status from the last time the Status Poller 330 was run, and determines, using the current state objects and the parent/child relation data, which objects are "dependency down" based on their reliance on an upstream object that has failed. This process repeats until there are no new critical tests found. Once the polling cycle is stable, a "snapshot" of the network is saved as the status of the network until the next polling cycle is complete. The network status information obtained is written into database 352 for use by other processes, such as the Decision Engine 334 when further analysis is required.

Polling a network for status information is an effective method of data gathering and provides a very accurate picture of the network at the precise time of the poll, however, it can only show the state of the network for that moment of time. Network health is not static. A monitored object can develop problems just after is has been polled and reflected a positive operational result. Moreover, this changed status will not be known until the device is queried during the next polling cycle. For this reason appliance 300 also incorporates the use of the Trap Receiver 332 to provide near real-time network status details.

Trap Receiver

A trap is a message sent by an SNMP agent to appliance 300 to indicate the occurrence of a significant event. An event may be a defined condition, such as a link failure, device or application failure, power failure, or a threshold that has been reached. Trapping provides a major incremental benefit over the use of polling alone to monitor a network. The data is not subject to an extended polling cycle and is as real-time as possible. Traps provide information on only the object that sent the trap, and do not provide a complete view of network health. Appliance 300 receives the trap message via Trap Receiver 332 immediately following the event occurrence. Trap Receiver 332 sends the details to Status View Maintenance Module 385, which requests the Status Poller 330 to query the network to validate the event and locate the root cause of the problem. Confirmed problems are passed to Case Management Module 326 to alert network management personnel.

The On-Demand Status Poller 335 provides status information to Decision Engine 334 during the verification stage. Unlike the Status Poller 330, On-Demand Status Poller 335 only polls the objects requested by the Decision Engine 334. Since this is usually a small subset of objects, the status can typically be found more quickly. The responses from these polls are fed back to the Decision Engine 334 for further processing and validation.

The Status View Maintenance Module 385 provides a gateway function between the Status Poller 330, and Root Cause Analysis and the Decision Engine Modules. The Status View Maintenance Module 385 controls the method by which network status information is created, maintained, and used. It serves as the primary interface for the depiction of network status details in the Status Maps and Status Table 387. Detailed object status information is presented through four (4) statuses: raw, dependency, decision, and case.

The Status Maps and Tables Module 387 is used to generate representations of complex relationships between network devices, systems, services and applications. Status Maps and Tables Module 387 works in conjunction with web server application 381 using known techniques and the HTML language to provide a web accessible user interface to the data contained in database 352. A Status Map depict the precise view of managed objects and processes as defined during the implementation process. The Status Map provides a fast and concise picture of current network issues, providing the ability to determine the specific source of network failure, blockage or other interference. Users can zoom to the relevant network view, and launch an object-specific Tools View that assists in the diagnostics and troubleshooting process and may include links to third party management tools, such as Cisco Resource Manager Essentials (RME), etc.

A Status Table enables a tabular view of managed network infrastructure. All managed network components 314 can be displayed individually, or assembled under categories according to device type, location, or their relationship to the monitoring of Groups of objects representing complete processes or other logical associations. As described in the User Interface section hereafter, a series of unique status icons clearly depict the operational state of each object, with the option to include more comprehensive status views including greater details on the various process elements for managed objects.

Status Plug-Ins/Bulk Pollers

As will be understood by those skilled in the arts, a plug-in, as used herein, is a file containing data used to alter, enhance, or extend the operation of an parent application program. Plug-ins facilitate flexibility, scalability, and modularity by taking the input from the a proprietary product and interfacing it with the intended application program. Plug-in modules typically interface with Application Program Interfaces (API) in an existing program and prevent an application publisher from having to build different versions of a program or include numerous interface modules in the program. In the present invention plug-ins are used to interface the status poller 335 with monitored objects 314.

The operation of plug-ins and bulk pollers is conducted at routine intervals by the Status Poller Module 330, and, on an as-needed basis, by the request of the On-Demand Status Poller Module 335. In the illustrative embodiment, the primary status plug-ins and pollers include Status Plug-ins 391, Bulk Plug-In Poller 392, Bulk UDP Poller 394, Bulk ifOperStatus Poller 396, Bulk TCP Poller 398 and Bulk ICMP Poller 397.

Status Plug-ins 391 conduct specific, individual object tests. Bulk Plug-In Poller 392 makes it possible to conduct multiple simultaneous tests of plug-in objects. Unlike many network management systems that rely solely on individual object tests, the Bulk Plug-In Poller 392 enables a level of monitoring efficiency that allows appliance 300 to effectively scale to address larger network environments, including monitoring via SNMP (Simple Network Management Protocol). Used almost exclusively in TCP/IP networks, SNMP provides a means to monitor and control network devices, and to manage configurations, statistics collection, performance, and security.

Bulk UDP Poller 394 is optimized to poll for events relating to UDP (User Datagram Protocol) ports only. UDP is the connectionless transport layer protocol in the TCP/IP protocol stack. UDP is a simple protocol that exchanges datagrams without acknowledgments or guaranteed delivery, requiring that error processing and retransmission be handled by other protocols. Bulk UDP Poller 394 permits multiple UDP polls to be launched within the managed network.

Bulk ifOperStatus Poller 396 monitors network infrastructure for the operational status of interfaces. Such status provides information that indicates whether a managed interface is operational or non-operational.

Bulk TCP Poller 398 polls for events relating to TCP (Transmission Control Protocol) ports only. Part of the TCP/IP protocol stack, this connection-oriented transport layer protocol provides for full-duplex data transmission. Bulk TCP Poller 398 permits multiple TCP polls to be launched within the managed network.

Bulk ICMP Poller 397 performs several ICMP (ping) tests in parallel. Bulk ICMP Poller 397 can initiate several hundred tests without waiting for any current tests to complete. Tests consists of an ICMP echo-request packet to an address. When an ICMP echo-reply returns, the raw0 status is deemed normal. Any other response or no answer within a set time generates a new echo-request. If an ICMP echo-reply is not received after a set number of attempts, the raw status is deemed critical. The time between requests (per packet and per address), the maximum number of requests per address, and the amount of time to wait for a reply are tunable by the network administrator using appliance 300.

Performance Monitoring Module

Figure 10:
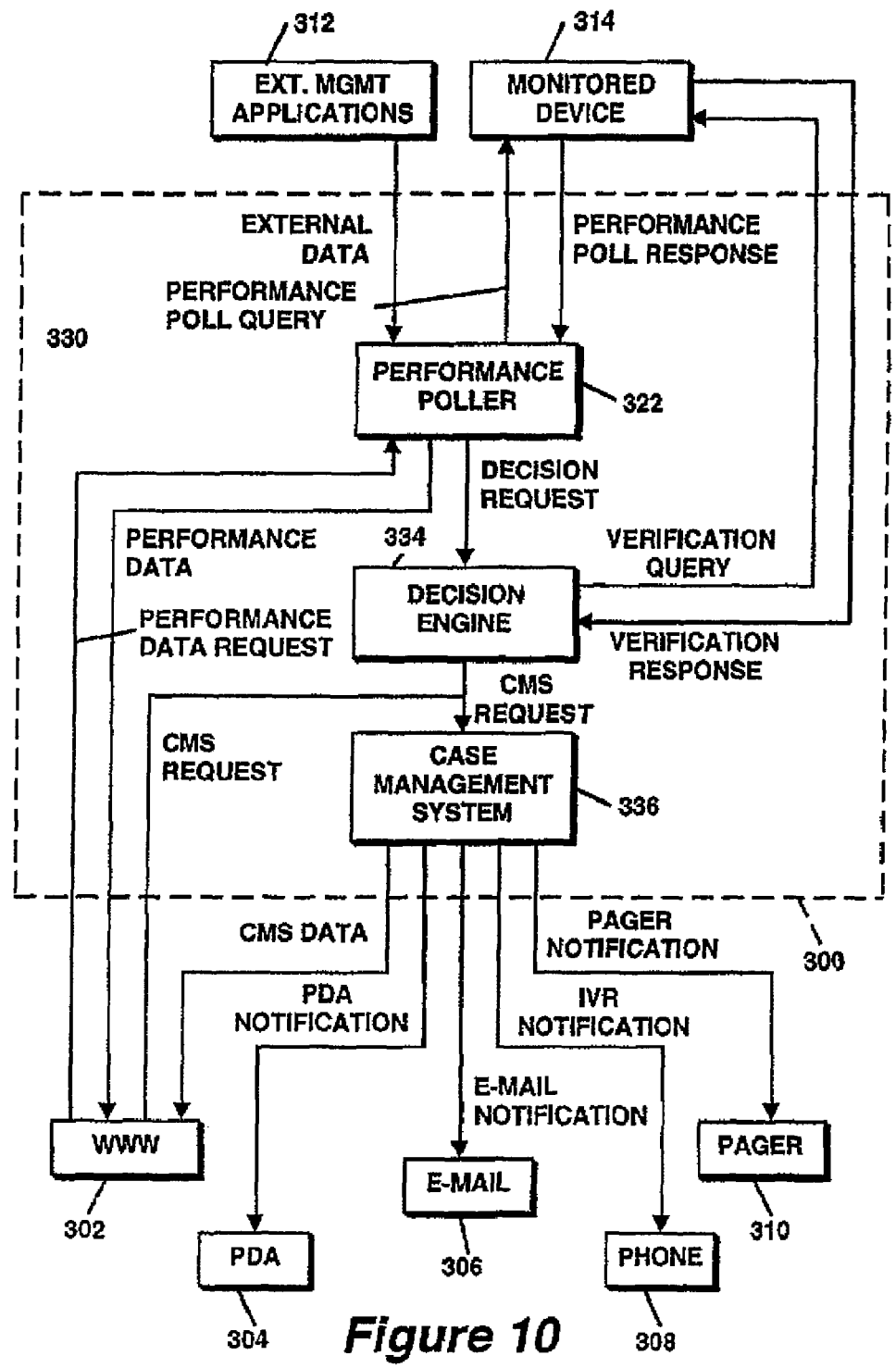
FIG. 10 is a conceptual block diagram illustrating the communication paths between the performance monitoring component of the inventive appliance and the external elements within the network environment.

The primary component of performance monitoring module 316 is performance poller 322. Performance poller 322 is the main device by which appliance 300 interacts with monitored device(s) 314a-n and is responsible for periodically monitoring such devices and reporting performance statistics thereon. Performance poller 322 is operatively coupled to application(s) 312, monitored device(s) 314, decision engine 334 and web process (es) 302. FIG. 10 illustrates the communication flow between the performance poller 322 and decision engine 334, as well as external elements. Performance poller 322 polls monitored device(s) 314a-n periodically for performance statistics. Specifically, performance poller 322 queries each device 314 with an SNMP Get call in accordance with the SNMP standard. In response, the monitored device 314 provides a performance poll response to performance poller 322 in the form of an SNMP Response call, also in accordance with the SNMP standard. Based on the results of the performance poll response, performance poller 322 generates and transmits decision requests to decision engine 334 in the form of messages. Such decision requests may be generated when i) a specific performance condition occurs, ii) if no response is received within predefined threshold, or iii) if other criteria are satisfied. Decision engine 334 is described in greater detail hereinafter. In addition, one or more external management applications 312 provide external management data to performance poller 322 in the form of messages.

In the illustrative embodiment, performance poller 322 may have an object-oriented implementation. Performance poller 322 receives external data from applications 312 through message methods. Such external applications may include Firewalls, Intrusion Detection Systems (IDS), Vulnerability Assessment tools, etc. Poller 322 receives performance data requests from web process 302 via Uniform Resource Locator (URL) methods. In response, poller 322 generates performance data for web process 302 in the form of an HTML method. In addition, poller 322 receives performance poll response data from a monitored device 314 in the form of an SNMP response method. In addition, poller 322 receives performance poll response data from a monitored device 314 in the form of an SNMP response method. As output, poller 322 generates a performance poll query to a monitored device 314 in the form of an SNMP Get method. Performance poller 322 generates decision requests to decision engine 334, in the form of a message.

Performance Poller 322 obtains performance data from network devices and applications, creating a comprehensive database of historical information from which performance graphs are generated through the user interface of appliance 300, as described hereafter. Such graphics provide network management personnel with a tool to proactively monitor and analyze the performance and utilization trends of various devices and applications throughout the network. In addition, the graphs can be used for diagnostics and troubleshooting purposes when network issues do occur.

A series of device-specific Performance Plug-ins 321 serve as the interface between the Performance Poller 322 and managed network objects. The performance criteria monitored for each component begins with a best practices of network management approach. This approach defines what elements within a given device or application will be monitored to provide for the best appraisal of performance status. The managed elements for each device or application type are flexible, allowing for the creation of a management environment that reflects the significance and criticality of key infrastructure. For instance, should there be an emphasis to more closely monitor the network backbone or key business applications such as Microsoft® Exchange, a greater focus can be placed on management of this infrastructure by increasing the performance criteria that is monitored. Likewise, less critical infrastructure can be effectively monitored using a smaller subset of key performance criteria, while not increasing the management complexity caused by showing numerous graphs that are not needed.

Once the performance management criterion is established, the Performance Plug-ins are configured for each managed device and application. Performance elements monitored may include, but are not limited to, such attributes as CPU utilization, bandwidth, hard disk space, memory utilization, or temperature. Appliance 300 continuously queries managed or monitored objects 314 at configured intervals of time, and the information received is stored as numeric values in database.

Event Processing

The appliance 300 architecture comprises sophisticated event processing capability that provides for intelligent analysis of raw network event data. Instead of accumulating simple status detail and reporting all network devices that are impacted, appliance 300 attempts to establish the precise cause of a network problem delivering the type and level of detail that network management personnel require to quickly identify and correct network issues. The primary components of event processing capability in appliance 300 are the Root Cause Analysis Module 383 and the Decision Engine 334.

Root Cause Analysis

When a change in network status is observed that may indicate an outage or other issue, the Status Poller 330 presents the to the Root Cause Analysis module 383 for further evaluation. During the course of a network problem or outage, this may consist of tens or even hundreds of status change event messages. These numerous events may be the result of a single or perhaps a few problems within the network.

The Root Cause Analysis Module 383 works directly with the Decision Engine 334 during the event evaluation process. Appliance 300 first validates the existence of an event and then identifies the root cause responsible for that event. This process entails an evaluation of the parent/child relationships of the monitored object within the network. The parent/child relationships are established during the implementation process of appliance 300, where discovery and other means are used to identify the managed network topology. A parent object is a device or service that must be functional for a child device or service to function. A child object is a device or service that has a dependency on a parent device or service to be functional. Within a network environment a child object can have multiple parent objects, and a parent object can have multiple children objects. In addition, the parent and child objects to a node or monitored object may be located at the same or different layers of the OSI network protocol model across the computer network. Because of this, a Dependency Checker function within Root Cause Analysis Module 383 performs a logical test on every object associated with a monitored object in question to isolate the source of the problem. When appliance 300 locates the highest object in the parent/child relationship tree that is affected by the event it has found the root cause of the problem.

Case Management System

The Case Management system 336 is an integral component of appliance 300 and provides service management functionality. Whereas the Decision Engine 334 works behind the scenes to identify and validate faults, Case Management system 336 is the interface and tool used to manage information associated with the state of the network. Case Management system 336 provides a process tool for managing and delegating workflow as it relates to network problems and activities. The Case Management generates service cases (or trouble tickets) for presentation and delivery to network management personnel.

Case management system 336 comprises a CMS application module 350, a database 352, a notification engine 356 and an escalation engine 354, as illustrated. CMS application module 350 comprises one or more applications and perform the CMS functionality, as explained hereinafter. CMS applications 350 receive CMS requests, in the form of URL identifiers from decision engine 334. In response, CMS applications 350 generate and transmit notification requests to notification engine 356, in the form of messages. CMS applications 350 generate and transmit CMS data to a worldwide web process 302 in the form of HTML data. Database 352 receives CMS queries from CMS applications 350 in the form of messages and generates in response thereto a CMS response in the form of a message, as well. In addition, database 352 receives notification queries from notification client 364, in the form of messages and generates, in response there, notification responses to notification client 364 in the form of messages as well.

Case Management system 336 accommodates Auto cases and Manual cases. Cases passed to the Case Management System from the Decision Engine Module appear as Auto-Cases. These system-generated cases are associated with a network problem. Appliance 300 has determined that the node referenced in the case is a device responsible for a network problem, based on the findings of Root Cause Analysis and the Decision Engine 334. The Auto Case is automatically assigned an initial priority level that serves until the case is reviewed and the priority is modified to reflect the significance of the problem relative to the network impact and other existing cases being handled.

Cases entered into Case Management system 336 by the network manager or network management personnel are called Manual Cases. This supports the generation, distribution, and tracking of network work orders, or can aid in efforts such as project management. Using a web browser, personnel can obtain the case data from either on-site or remote locations, and access a set of device-specific tools for diagnostics and troubleshooting. Unlike other general-purpose trouble ticketing systems, the appliance 300 has case management capabilities are specifically optimized and oriented to the requirements of network management personnel. This is reinforced in both the types and level of information presented, as well as the case flow process that reflects the specific path to network issue resolution. Opening a case that has been generated shows the comprehensive status detail such as the impacted network node, priority, case status, description, and related case history. The network manager or other personnel can evaluate the case and take the action that is appropriate. This may include assigning the case to a network engineer for follow-up, or deleting the case if a device has returned to fully operational status.

The main Case Management screen of the user interface provides a portal through web server application 381 from which all current case activity can be viewed, including critical cases, current priority status, and all historical cases associated to the specific object. Case data is retained in appliance 300 to serve as a valuable knowledge-base of past activity and the corrective actions taken. This database is searchable by several parameters, including the ability to access all cases that have pertained to a particular device. A complete set of options is available to amend or supplement a case including: changing case priority; setting the case status; assigning or re-assigning the case to specific personnel; correlating the case to a specific vendor case or support tracking number, and updating or adding information to provide further direction on actions to be taken or to supplement the case history.

Escalation engine 354 tracks escalations and requests notifications as needed. Escalation engine 354 generates and transmits escalation queries to database 352 in the form of messages and receives, in response thereto, escalation responses in the forms of messages. In addition, escalation engine 354 generates and transmits notification requests, in the form of messages, to notification server 360 of notification engine 356, in the form of messages. Automated policy-based and roles-based case escalation processes ensure that case escalations are initiated according to defined rules and parameters. Cases not responded to within pre-established time periods automatically follow the escalation process to alert management and other networking personnel of the open issue.

Notification Engine

When a new auto case or manual case is generated or updated, appliance 300 initiates a notification process to alert applicable network personnel of the new case. This function is provided through Notification Engine 356. Appliance 300 utilizes a configurable notification methodology that can map closely an organization's specific needs and requirements. Appliance 300 incorporates rules- and policy-based case notification by individual, role, or Group, and includes additional customizability based on notification type and calendar. Supported notification mechanisms include various terminal types supporting the receipt of standard protocol text messaging or e-mail, including personal computer, text pager, wireless Personal Digital Assistant (PDA), and mobile phones with messaging capability. The e-mail or text message may contain the important details regarding the case, per the notification content format established in system configuration.

Figure 9:
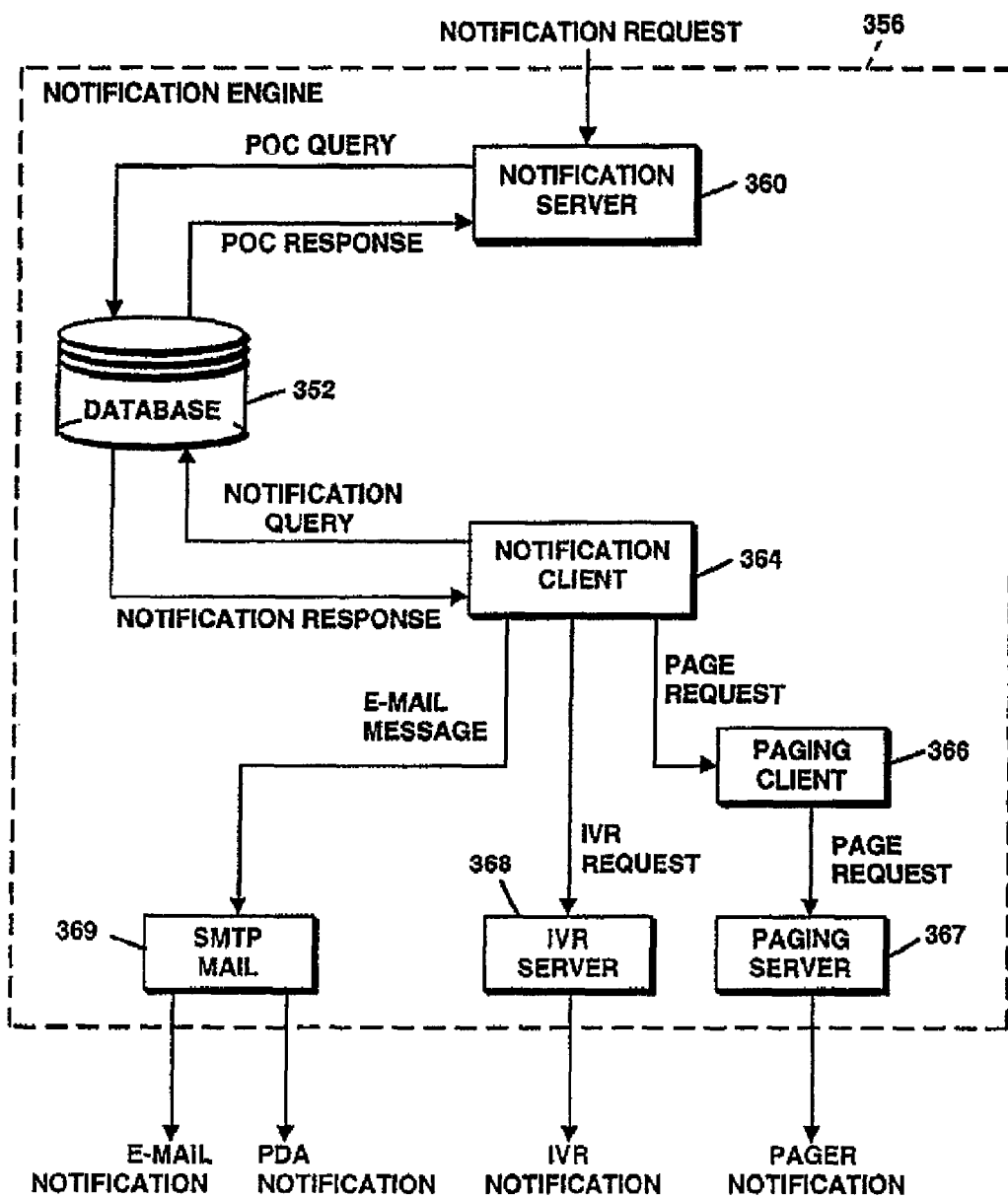
FIG. 9 is a conceptual block diagram of the notification engine component of the network management appliance of the present invention.

As illustrated in FIG. 9, notification engine 356 comprises notification server 360, database 352, notification client 364, paging client 366, paging server 367, Interactive Voice Response (IVR) server 368 and SMTP mail module 369. Notification engine 356 generates notifications via e-mail and pager as necessary. Notification server 360 accepts notification requests, determines notification methods, and stores notifications in database 352. As stated previously, notification server 360 receives notification requests from CMS applications 350. Notification server generates and transmits Point Of Contact (POC) queries in the form of messages to database 352 and receives, in response thereto, POC responses, also in the form of messages. Notification client 364 generates notifications using appropriate methods. Notification client 364 generates and transmits notification queries, in the form of messages, to database 352 and receives in response thereto notification responses, also in the form of messages. In addition, notification client 364 generates and transmits page requests in the form of messages to paging client 366. Notification client 364 further generates, in the form of messages, IVR requests to IVR server 368 and e-mail messages to SMTP mail module 369. Paging client 366 receives page requests from notification client 364 and forwards the page requests onto page server 367. Paging server 367 generates pager notifications, in the form of messages, to a pager device 310. Paging server 367 accesses a TAP terminal via a modem or uses the Internet to forward the pager notification. IVR server 368 receives IVR requests and calls phone 308 via an IVR notification in the form of a telephone call which may be either packet-switched or circuit-switched, depending on the nature of the terminating apparatus and the intervening network architecture. SMTP mail module 369 processes notifications via e-mail and acts as a transport for paging notifications. SMTP mail module 369 generates messages in the form of e-mail notifications to e-mail process 306 and PDA notifications to personal digital assistant device 304.

Decision Engine

Decision Engine 334 is an extensible and scaleable system for maintaining programmable Finite State Machines created within the application's structure. Decision Engine 334 is the portion of system architecture that maintains the intelligence necessary to receive events from various supporting modules, for the purpose of verifying, validating and filtering event data. Decision Engine 334 is the component responsible for reporting only actual confirmed events, while suppressing events that cannot be validated following the comprehensive analysis process.

Figure 7:
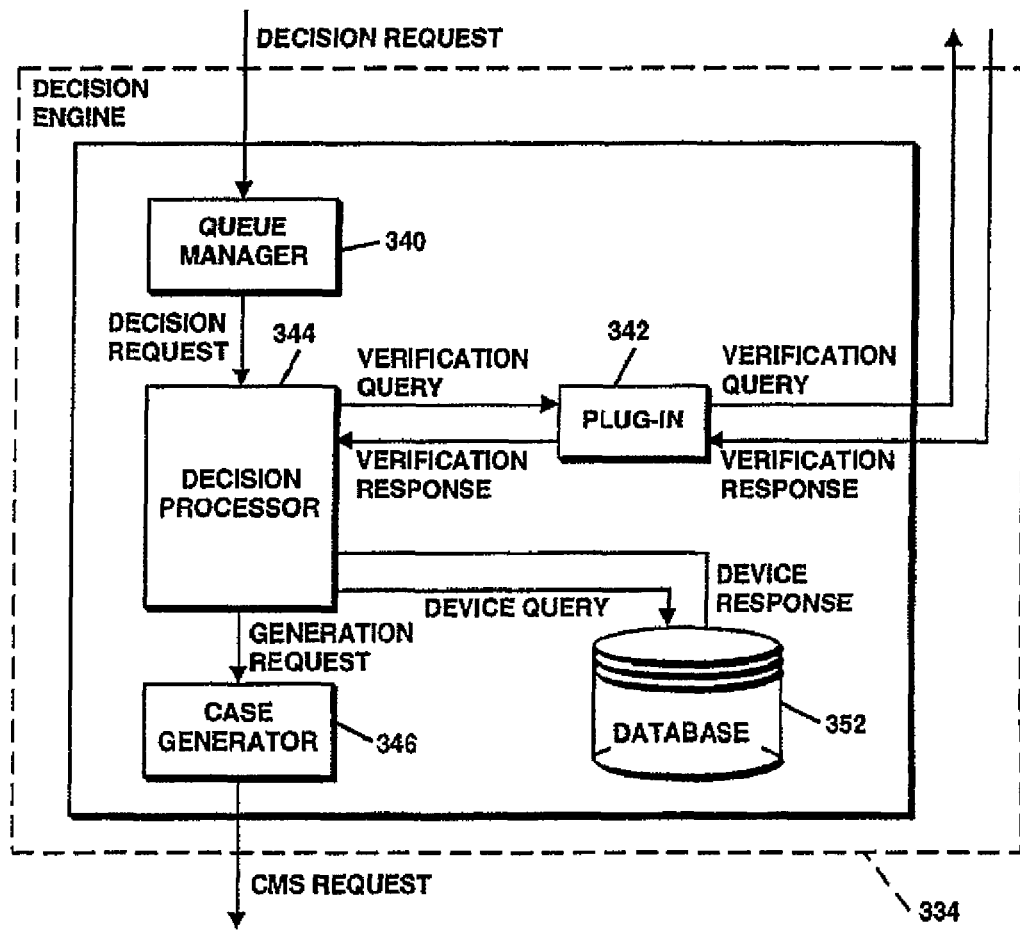
FIG. 7 is a conceptual block diagram of the decision engine component of the network management appliance of the present invention.
Figure 8:
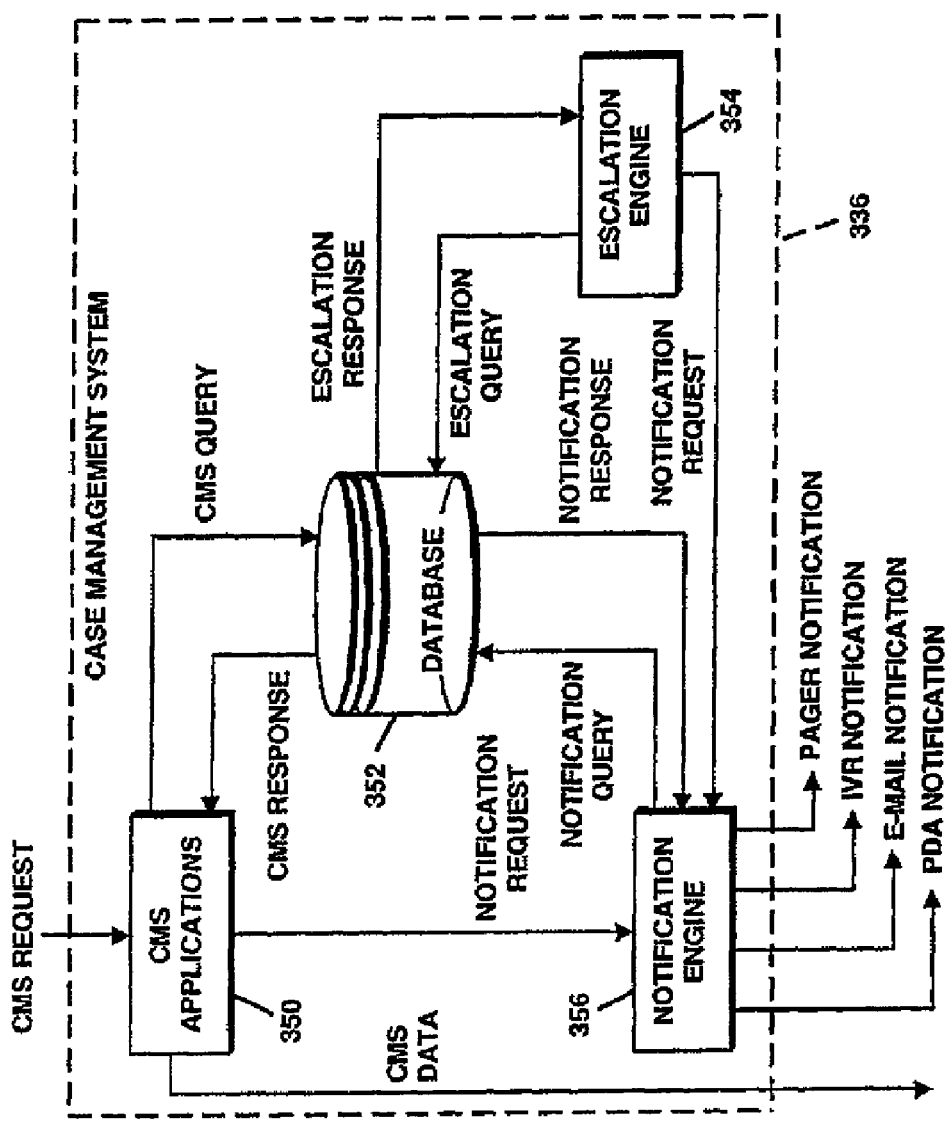
FIG. 8 is a conceptual block diagram of the case management system component of the network management appliance of the present invention.

Referring to FIG. 7, decision engine 334 comprises, in the illustrative embodiment, a queue manager 340, decision processor 344, case generator 346, database 352 and one or more plug in modules 342. As illustrated, decision engine 334 receives decision requests from any of Performance poller 322, Status Poller 330 or Trap Receiver 332, in the form of messages. A queue manager 340 manages the incoming decision requests in a queue structure and forwards the requests to decision processor 344 in the form of messages. Decision processor 344 verifies the validity of any alarms and thresholds and forwards a generation request to case generator request 346 in the form of a message. Case generator 346, in turn, compiles cases for verification and database information and generates a CMS request which is forwarded to case management system 336, described in greater detail hereinafter.

In addition, decision processor 344 generates and transmits device queries in the form of messages to database 352. In response, database 352 generates a device response in the form of message back to decision processor 344. Similarly, decision processor 344 generates and transmits verification queries in the form of messages to plug in module 342. In response, module 342 generates a verification response in the form of a message back to decision processor 344. Plug in module 342 generates and transmits verification queries in the form of messages to a monitored device 314. In response, monitored device 314 generates a verification response in the form of a message back to plug-in module 342.

Decision engine 334 may be implemented in the C programming language for the Linux operating system, or with other languages and/or operating systems. Decision engine 334 primarily functions to accept messages, check for problem(s) identified in the message, and attempts to correct the problem. If the problem cannot be corrected the decision engine 334 opens a "case". In the illustrative embodiment, decision engine 334 may be implemented as a state-machine created within a database structure that accepts messages generated by events such as traps and changes state with messages. If the decision engine reaches certain states, it opens a case. The main process within the decision engine state-machine polls a message queue and performs the state transitions and associated tasks with the transitions. Events in the form of decision requests are processed by the decision engine/virtual state-machine. The decision module/virtual state-machine processes the request and initiates a verification query. The verification response to the verification query is processed by the decision module/virtual state-machine. Based on the configuration of the decision module/state-machine the decision module/state machine initiates a case management module case request. Events are polls, traps, and threshold violations generated by the status poller, fault trapper, and performance poller respectively.

Figure 11:
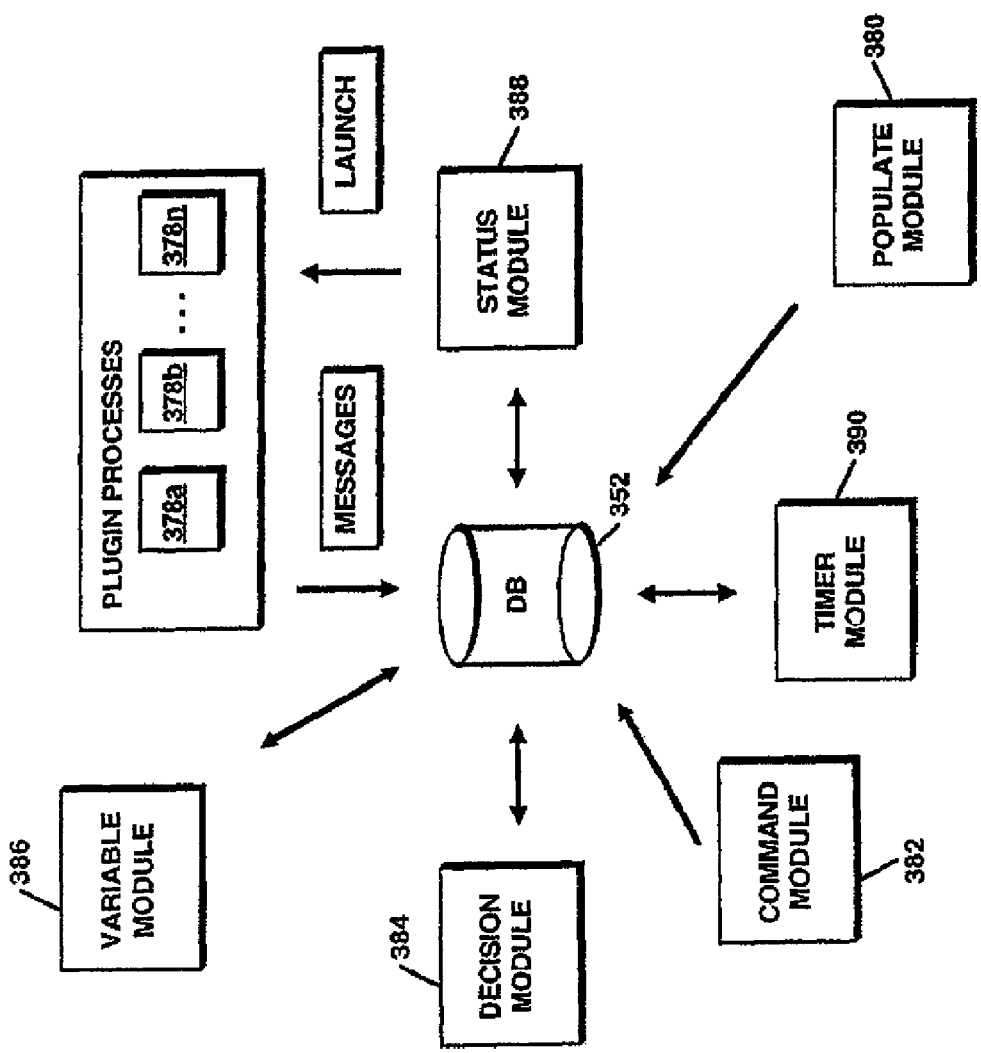
FIG. 11 is a conceptual block diagram of a decision engine and the various component modules therein in accordance with the present invention.

As shown in FIG. 11, decision engine 334 comprises several continuously running processes or modules including populate module 380, command module 382, decision module 384, variable module 386, on demand status poller module 388, and timer module 390, described in greater detail hereinafter. These processes may launch new processes when required. In the illustrative embodiment, these processes share database tables in database 352 as a means for communication by accessing and manipulating the values within the database. In FIGS. 4-6 and 10, the functions of Decision Engine 334 are performed by command module 382, decision module 384, variable module 386, on demand status poller module 388, and timer module 390, described in greater detail hereinafter. In FIG. 7, the functions of Decision Processor 344 are performed by decision module 384, variable module 386, on demand status poller module 388, and timer module 390. The functions of Case Generator 346 is performed by command module 382.

Populate Module

The populate module 380 creates and initializes the state machine(s) to the "ground" state for each managed object 314 whenever a user commits changes to their list of managed objects. In the illustrative embodiment, unless purposefully overridden, the populate module 380 will not overwrite the current machine state for a managed object. Otherwise, notifications could be missed. Also, the deletion of an object upon a commit results in the deletion of all state machines, timers, and variables associated with the object to prevent unused records and clutter in database 352.

Command Module

The command module 382 retrieves records from the command table, performs the task defined in a database record, and, based on the result returned by the command, places a message in the message queue, i.e. the Message Table. In the illustrative embodiment, a command can be any executable program, script or utility that can be run using the systems library function.

In illustrative embodiment, the command module 382 may be implemented in the C programming language as a function of a Decision Engine object and perform the functions described in the pseudo code algorithm set forth below in which any characters following the "#" symbol on the same line are comments:

while TRUE # loop forever
    retrieve the record that has been sitting in the commands_ queue table for the longest period of time
    use the system command (or some other as yet to be determined method) to execute the command found in the action field of the current record. The argument list for action will be build using the values found in the host, poll, instance, and argument fields of the current record. Upon completion of the command, if the message found in the message field is not blank, put the message into the message queue.
end loop forever Decision Module The decision module 384 retrieves messages from the message queue, determines which state machine the message is intended for, changes the state of the machine based on the content of the message, and "farms out" to the other modules the tasks associated with the state change. In the illustrative embodiment, a task has associated therewith a number of optional components including a type, action, arguments, condition and output message. A brief description of each task component is shown below:

type—identifies which module, i.e., command, variable, timer, or on demand state poller, that is to perform the task. The action of some types of tasks may be handled by the decision module and not sent to another module. For example, a message with the type "say" is just a request to put a new message into the message queue. The decision module handles such task.

action—the specific action the module is to take. For example, increment a counter or start a timer.

arguments—any arguments required to complete the action condition—if present, identifies a condition that must be met before the associated message can be put into the message queue. A condition may consist of a comparison between the value of a variable stored in the variables table and a constant value or the value of another variable that evaluates as either true or false. An example condition would be "count>5", which means that the value of the value field in the variables table record where the value of the varName field is 'count' for the current object should be greater than five for a message to be put into the queue. Condition expressions may be of the form: <VAR_NAME COMPARISON_OPERATOR VALUE>[[AND|OR] [VAR_NAME COMPARISON_OPERATOR VALUE]] .... By adhering to this format, the code that parses the condition expression will not have to be changed if the condition expression changes. Also, such format allows for arbitrarily complex condition expressions.

output message—the message to be put into the message queue upon completion of the task. The output message can be blank indicating that there is no message to put into the message queue on completion of the task. Since messages are deleted as they are taken or "popped" from the message queue, the messages may be logged to the log table in database 352 to provide a permanent record of message traffic.

In order to provide additional flexibility to the arguments field of the active_timers, command_queue, and variable_queue tables, the arguments field in the transition_functions and state_functions tables may be allowed to contain patterns that can match any of the field names found in the messages table or the value of any varName field in the variables table. When a matching pattern is found it is replaced with the value from the messages table field that the pattern matches or, if the pattern matches a varName field in the variables table, the pattern is replaced with the appropriate value from the from the value field in the variables tables. The format for a replaceable pattern may be:

%[PATTERN]%

Where PATTERN is count, name, or saveInfo, for example. Pattern matching and replacement may be done within the decision module before a "task" record is created for one of the queues. The varName field in the variables table should not have a value that conflicts with the field names in the messages table. Since the message table is checked first, the use of a varName that matches a field in the messages table would result in the pattern being replaced with a value different from what the user expected. To prevent this from happening, any attempt to add a record to the variable table may have to have the value of the varName field checked against a list or reserved words.

In illustrative embodiment, the decision module 384 may be implemented in the C programming language as a function of a Decision Engine object and perform the functions described in the pseudo code algorithm set forth below in which any characters following the "#" symbol on the same line are comments:

```
1   while True # run forever
    retrieve all messages from the messages table (with a LIMIT of 100 messages)
2       for each message
        parse the message record into its component parts: message, object
        (host, poll, instance), and extra_info
        using the object value create an SQL query that will retrieve the current
        state record for all active machines of the object
3           for each machine of object
            use the message and the current state of the machine to create an
            SQL query that will retrieve the next state of the machine
4               if a next state is found
                update the current state record for the machine in the
                current_state table to the new state
                Using the current machine type, the current state (pre-
                transition) and the message, create an SQL query that will
                retrieve all tasks that are to be performed as a result of the
                machine receiving the current message from the
                transition_functions table
5                   for each task
                    determine the type of task ( timer, counter, status
                    request, or command) and insert into the appropriate
                    module's queue a task record with field values set to
                    the values found in the current transition_functions
                    table record. If the arg field from the
                    transition_functions record contains a recognized
                    replaceable string with the pattern %[PATTERN%],
                    replace the string with the value retrieved from the
                    current messages table record from the field that
                    matches the replaceable string. If the pattern does not
                    match one of the field names from the messages
                    table, Check the variables table for a record with a
                    varName field with a value that matches the pattern. If
                    a record is found, replace the pattern with the value of
                    the value field
                    from the variables table record with the matching
                    varName
                    # end for each task
                    Using the current machine type and the post transition
                    state create an SQL query that will retrieve all tasks
                    that are to be performed as a result of the machine
                    "arriving" at the next state from the state_functions
                    table. If the arg field from the state_functions record
                    contains a recognized replaceable string, replace the
                    string with the value retrieved from the current record
                    from the field that matches the replaceable string.
6                       for each task
                        determine the type of task ( timer, counter,
                        status request ,or command) and insert into
                        the appropriate module's queue a task record
                        with field values set to the values found in the
                        current transition_functions table record. If the
                        arg field from the transition_functions record
                        contains a recognized replaceable string with
                        the pattern %[PATTERN%], replace the string
                        with the value retrieved from the current
                        messages table record from the field that
                        matches the replaceable string. If the pattern
                        does not match one of the field names from the
                        messages table, Check the variables table for
                        a record with a varName field with a value that
                        matches the pattern. If a record is found,
                        replace the pattern with the value of the value
                        field from the variables table record with the
                        matching varName
                        # end for each task
4               # end if
3           # end for each machine of object
2       # end for each message
1   # end of while forever loop
```

Variable Module

The Variable module 386 retrieves records from the variable_queue table, performs the task defined in the record, and, upon completion of the task, puts the associated message into the message queue. Currently defined tasks include incrementing a counter, decrementing a counter, setting a counter to a specific value, and saving a "note" for later use. All tasks performed by the variable module 386 consist of either setting a variable to a value or updating a variable with a new value. In the illustrative embodiment, task statements may be assignment statements of the form:

VAR_NAME=VALUE

Where VAR_NAME is the name of variable being set or updated and VALUE is the value that VAR_NAME is being set to. VALUE can be of any data type (integer, float, or string, e.g.). VALUE can be a single value, such as 6, or consist of an expression that can include the VAR_NAME, such as count+ 1. If present in the current variable record, a condition has to be met before the message is put into the message queue.

In illustrative embodiment, the variable module 386 may be implemented in the C programming language as a function of a Decision Engine object and perform the functions described in the pseudo code algorithm set forth below in which any characters following the "#" symbol on the same line are comments:

```
1    while TRUE # loop forever
         retrieve all records ordered by time in an ascending order from the variable
         queue with a LIMIT of 100 records
2        for each record
             if the the value of the action field is a non-empty string
                 determine the name of the variable that is to be set or updated. The
                 name of the variable will always be the lvalue of the assignment
                 statement and be of the form %[VAR_NAME]% = [SOME_VALUE]
                 where VAR_NAME is replaced with the actual variable name
                 (count, e.g.). Using the VAR_NAME create an SQL query that will
                 determine whether or not a record for this variable exists in the
                 variables table
             if the variable is not in the variables table,
                 INSERT a record into the variables table with the varName set to
                 VAR_NAME and value set to SOME_VALUE
             if the variable is in the variables table,
                 UPDATE the record with varName set to VAR_NAME and value set
                 to SOME_VALUE
3                if there is a non-null value in the condition field of the current
                 record
                     create an SQL query using the condition value ("count >
                     5", e.g.) that will test whether or expression defined in
                     the condition is true or false
                 perform the query
4                    if the query returns "true" (i.e., the condition has been
                     ;met)
                         insert the message found in the message field
                         of the current record into the message queue.
                     # end if
3            # end if
             else there is no condition. insert the message found in the
             message field of the current record into the message queue
             else there is no condition. insert the message found in the
             message field of the current record into the message queue
2        # end for each record
1    # end loop forever
```

On Demand Status Poller Module

The on demand status poller module 388 retrieves records from the status_request table with a user defined frequency, e.g. every 10 seconds. The module improves efficiency by batching status requests which will all be "launched" at the same time. The retrieved status requests are "farmed out" to the appropriate poller module. The on demand status poller module 388 waits for the results of the status requests to be returned by the pollers. Based on the result, the appropriate message is inserted into the message queue.

In illustrative embodiment, the on demand status poller module 388 may be implemented in the C programming language as a function of the Decision Engine object and perform the functions described in the pseudo code algorithm set forth below, in which any characters following the "#" symbol on the same line are programmers comments:

```
retrieve all records from the statReq table
    Based on the type of the poll request (ICMP, TCP, PLGN, etc)
    "farm out" the status requests to the appropriate bulk poller.
```

-continued

```
retrieve the results (up or down) returned by the bulk pollers
    for each status poll result
    insert the appropriate message into the message queue
# end for loop
```

Timer Module

The timer module 390 retrieves records from the active_timers table, performs the tasks defined in the record, and, upon completion of the task, puts the associated message into the message queue. Currently defined tasks include expiring a timer and clearing a timer. If present in the current timer record, a condition has to be met before the message is put into the message queue. An example condition would be "UNIX_TIMESTAMP>exp_time", which checks to see if a timer has expired.

In illustrative embodiment, the timer module 390 may be implemented in the C programming language as a function of the Decision Engine object and perform the functions described in the pseudo code algorithm set forth below in which any characters following the "#" symbol on the same line are programmers comments:

```
1    while TRUE # loop forever
         retrieve all records with an action of either clearTimer, clearTimers,
         or resetTimer
2        for each record
             if the action is clearTimer
                 if the current record has a non-blank argument, delete the
                 oldest record with an action of setTimer and with a message
                 that equals the value of the argument field for the current
```

-continued

```
             object/machine tuple. Otherwise, delete the oldest record
             with an action of setTimer for the current object/machine
             tuple without regard for the value of the message field
             else if the action is clearTimers delete all records with an
             action of setTimer for the current object/machine tuple
             else if the action is resetTimer reset the appropriate timer by
             updating the timer record that is to be reset with the following
             psuedoSQL statement: update timer_que set timer_id =
             current time, argument = current_argument where object =
             current object and message = current message.
             # end for each record
             delete all records with an action of either clearTimer or
             clearTimers
             retrieve all records where the action is setTimer and
             timer_id < current time with a LIMIT of 100 records
3           for each record
4               if there is a non-null value in the condition field
                of the current record
                create an SQL query using the condition value
                perform the query
5                   if the query returns "true" (i.e., the
                    condition has been met) insert the
                    message found in the message field of
                    the current record into the message
                    queue.
5               # end if the condition is met
4           # end if there is a condition
                else there is no condition. insert the message
                found in the message field of the current record
                into the message queue.
3           # end for each record
            delete all of the records just retrieved. Delete the
            records based on the unique timer_id to ensure that
            the correct records are deleted.
    1    # end loop forever
```

One or more of the above described processes or modules, including populate module 380, command module 382, decision module 384, variable module 386, on demand status poller module 388, and timer module 390, operate in conjunction to collectively perform the functions the elements of decision engine 334 and other elements of appliance 300 as noted herein.

Finite and Virtual State Machines

Figure 12A:
FIGS. 12A-C are conceptual illustrations of a state machine and hypothetical states in accordance with the present invention.
Figure 12B:
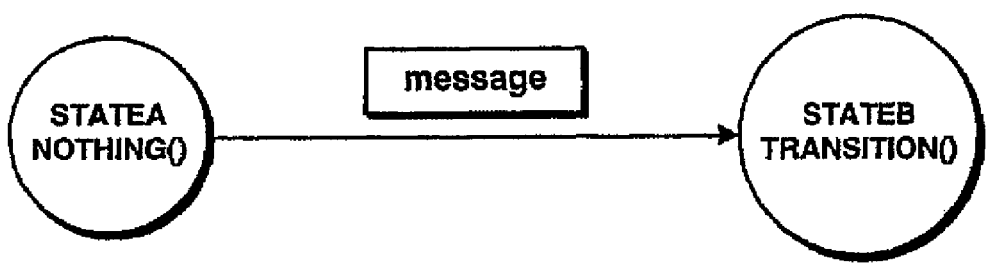
Figure 12C:
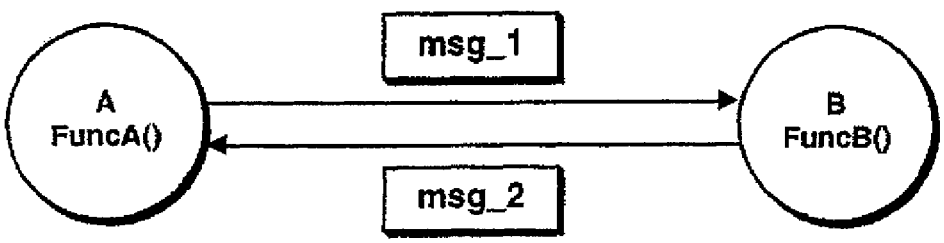

FIGS. 12A-C are provided as visual aid to help the reader understand the nature of state machines. A two-state state machine can be represented by the diagram illustrated in FIG. 12A. The diagram FIG. 12A can be interpreted as follows: If you are at StateA and if you get a message "message", then do what is specified in "transition" and after that we are at StateB.

Such For design purposes, the same state machine can be represented as illustrated in FIG. 12B. A more complex machine may be illustrated in the diagram of FIG. 12C. The state machine illustrated in the diagram of FIG. 12C may be represented as a virtual state machine in database 352 as shown in Table 1 below:

TABLE 1

"sm_Table"

| state_name | Function | Message | Target_state | Active |
|---|---|---|---|---|
| A | FuncA( ) | Msg_1 | B | 1 |
| B | FuncB( ) | Msg_2 | A | 0 |

In the illustrative embodiment, messages are the mechanism to make a state machine change state, in addition to control messages to initialize state machines or to forcefully change state. Messages arrive from a message queue. At any time only the active states can accept messages. The last column in Table 1 determines the active state for the state machine. Only one state is active (active=1) and all other states are inactive (active=0). If no active state can accept the message, the message is discarded. Initially, the state machine is at ground state, meaning the ground state is the only active state. After handling of the message, the machine returns to the ground state again.

Messages are kept in a database table and handled in a first come first served basis. Each message has an associated timestamp with it, which helps to determine which message arrived earlier. Since that timestamp is unique it is also used as the message id, as shown in Table 2 below:

TABLE 2

"messages"

| msg_id | msg |
|---|---|
| 971456805855844 | TCP_down |
| 971456805878973 | SNMP_down |

A state machine will frequently request waiting before changing states. Instead of launching new processes for each wait request, a single timer process operating on a set of timers may do the same job with much less resource. A special timers table is employed for that purpose. Since a unique id for each timer is needed, a timestamp may also be used for that purpose, as shown in Table 3 below:

TABLE 3

"timers"

| Timer_id | expiration | msg |
|---|---|---|
| 971456805855844 | 971456865855844 | Wait1min_over |
| 971456805858344 | 971457105855844 | Wait5min_over |

The timer process operates on the timers table by checking for the expiration of timers and if the current time is past expiration, deletes the entry from table and inserts the message into the message queue.

Frequently the functions to be executed at state transitions are status requests. Instead of launching those requests everytime they are requested, the requests may be kept in a status_request table, as shown in Table 4 below. The status handler process handles the execution of those status requests using Table 4.

TABLE 4

"status_request"

| Req_id | StatusReqst_name | msg |
|---|---|---|
| 971456805858344 | Check_TCP | TCP_OK |
| 971457105855844 | Check_AC | AC_OK |

Given a fundamental understanding of state machines and how their respective states can be changed using message input, the finite state machine models on which all the virtual state machines used within the appliance 300 are is described hereafter. Records contained within database 352 define several finite state machine models managed by decision engine 334.

Finite State Machines

Decision Engine 334 is designed to minimize resource utilization, allow for the launching of multiple Finite State Machines, and conduct multiple activities simultaneously.

Decision Engine 334 can be used to perform any decision making process which can be modeled by a Finite State Machine. A finite state machine model in accordance with the illustrative embodiment may be defined by the following:

- A finite set of states. Each state represents a condition or step in the decision process. Only one state in each machine may be active at a time, and this is referred to as the 'Current State'
- A finite set of inputs. (events that trigger state changes and the execution of actions) Inputs are represented as messages pertaining to objects, providing the events that trigger state changes and the execution of actions. Any message that does not have a Current State with a transition waiting (listening) for it will be considered invalid and discarded. This provides the validation process for the Decision Engine 334. An infinite number of possible messages are filtered to allow only a finite number of messages through when they are valid.
- Finite set of transitions. Given a particular state and a particular message, transfer is facilitated to the next state. At the point in time when the transition occurs, it can initiate any tasks defined for the transition and target state. Each transition is uniquely defined by the 'Current State, Message and Destination State'.
- Set of transition tasks that define zero or more actions that are to be performed based on the current state and input received (e.g., anytime current state is 'StateA' and the input 'MessageA', perform the transition tasks for 'StateA, MessageA.' For example, actions may include launching the On-Demand Status Poller Module to recheck the status of an object, setting a timer, and opening a case that identifies an object as being critical.
- Set of state tasks that define zero or more actions that are to be performed based on the next state independent of the input or current state (e.g., anytime the target state is 'StateA' perform the state tasks for 'StateA').

To keep the number of records in database 352 manageable no matter how large the number objects managed by apparatus 300, each type of finite state machine is defined only once. For each managed object 314 a virtual state machine comprising the name of the object, the type of state machine and the current state of the state machine is added to and maintained by database 352. As events are received, the decision engine 334 uses database 352 to "look up" the next state and the actions to be performed in the tables and records that define the state machines. FIGS. 16-20 illustrate several finite state machine models supported by the illustrative embodiment of the apparatus 300 including the finite set of states within each finite state machine model and the input data necessary to change states. A description of each finite state machine model is described below.

noWaitVerify State Machine

Figure 16:
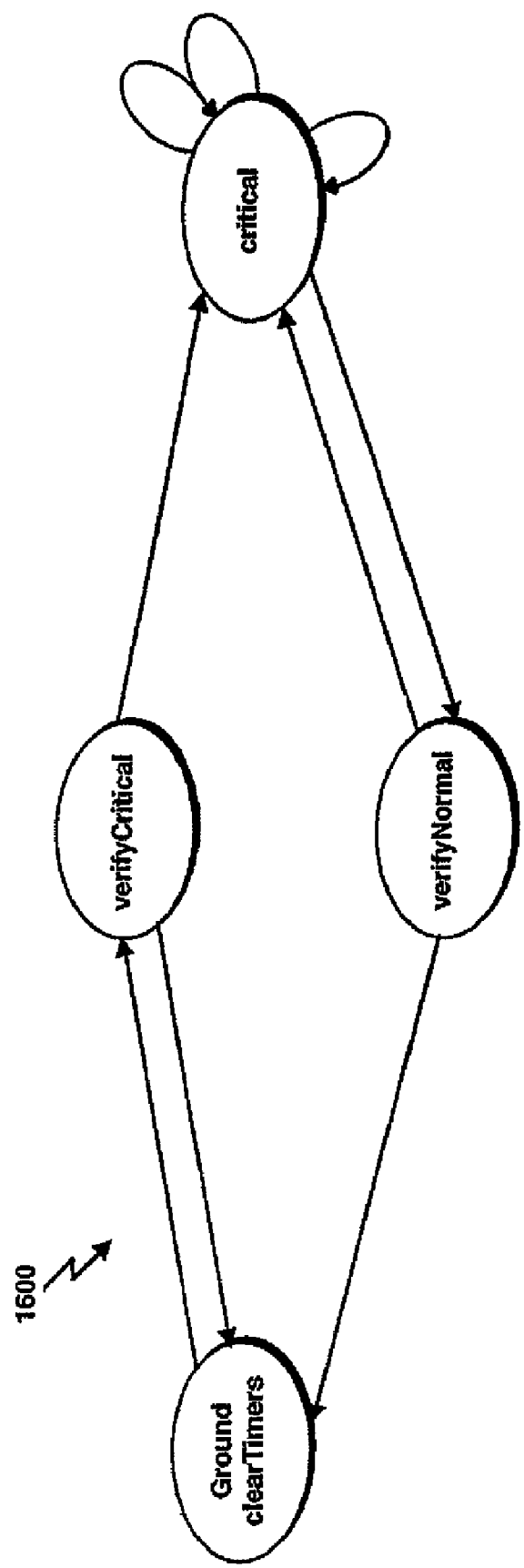
FIGS. 16-20 are conceptual illustrations of a state machine models and their respective states in accordance with the present invention.

FIG. 16 illustrates the noWaitVerify finite state machine model 1600 supported by the illustrative embodiment of appliance 300. The purpose of the noWaitVerify state machine 1600 is to verify the status of an object (as up or down) by requesting that the appropriate poller module recheck the status of the object. If the result of the recheck matches the last status of the object, the object's status is verified and a case is opened or updated as appropriate. The functionality of the noWaitVerify state machine is described in pseudo code forth below:

---

Accept critical "status events" from the dependency module.
Send a poll request to the on-demand status poller.
If the "status" is verified to be critical, update a case with "warning".
If the "status" remains critical for 10 minutes, update a case with "critical".
If the "status" remains critical for 1 hour, update case.
If the "status" returns to normal, verify status and update a case with "normal".

---

Table 5 below identifies the next state transitions and associated actions for the noWaitVerify state machine:

| State Name | Input | Next State | Actions |
|---|---|---|---|
| Ground | Critical | verifyCritical | Start 10 min. Timer<br>Start 1 hr. Timer<br>Re-poll status of object |
| verifyCritical | Critical | critical | Start 500 sec. Timer<br>Open new case |
| verifyCritical | Normal | Ground | No actions |
| critical | Critical600 | critical | Update case with 10 min. warning |
| critical | Critical3600 | critical | Update case with 1 hour warning |
| critical | Normal | verifyNormal | Re-poll status of object |
| critical | Retest | critical | Start 500 sec. Timer<br>Re-poll status of object |
| verifyNormal | Critical | critical | Clear current 500 sec. Timer<br>Start a new 500 sec. timer |
| verifyNormal | Normal | Ground | Update case with "returned to normal" message | icmpVerify State Machine

Figure 17:
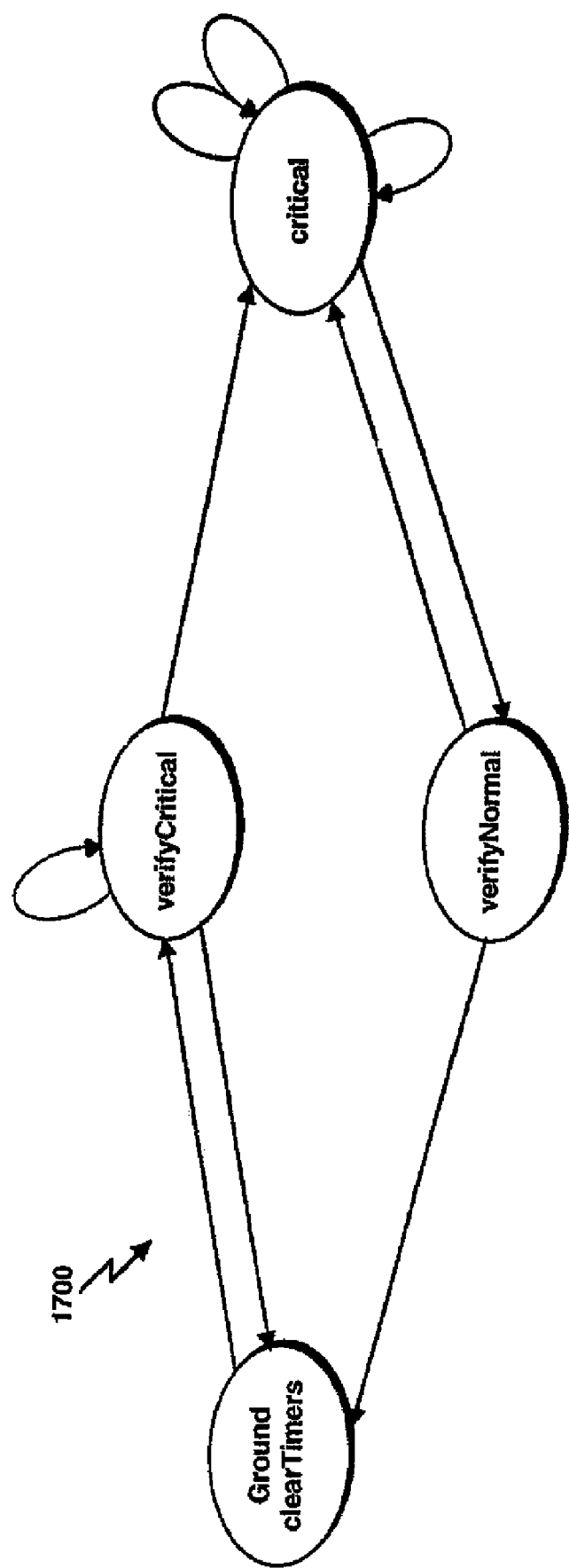

FIG. 17 illustrates the icmpVerify finite state machine model 1700 supported by the illustrative embodiment of the apparatus 300. The purpose of the icmpVerify state machine is to verify the status of an object (as up or down) by requesting that the appropriate poller recheck the status of the object. If the result of the recheck matches the last status of the object, the object's status is verified and a case is opened or updated as appropriate. What differentiates the nowaitVerify state machine from the icmpVerify state machine is that the icmpVerify state machine waits 40 seconds before requesting that an object's status be rechecked. The functionality of the icmpVerify state machine is described in pseudo code forth below:

---

Accept critical "status events" from the dependency module.
Wait at least 40 seconds in case spanning tree is causing the problem.
Send a poll request to the on-demand status poller.
If the "status" is verified to be critical, open or update a case with "warning".
If the "status" remains critical for 10 minutes, update a case with "critical".
If the "status" remains critical for 1 hour, update case.
If the "status" returns to normal, verify status and update a case with "normal".

--- slidingWindow State Machine

Figure 18:
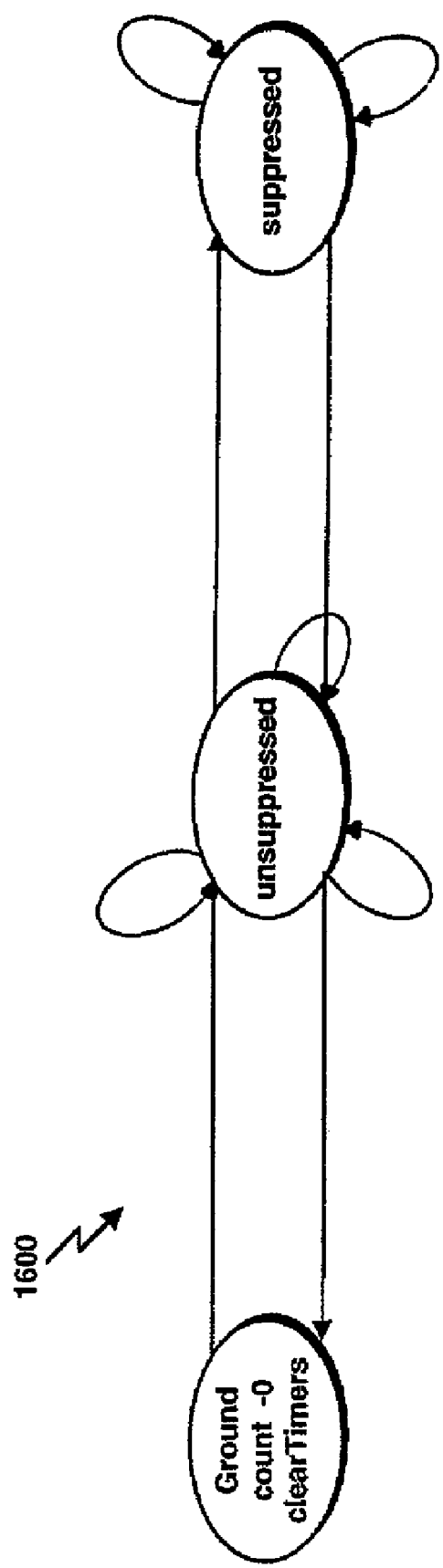

FIG. 18 illustrates the slidingWindow finite state machine model 1800 supported by the illustrative embodiment of the apparatus 300. The purpose of the slidingWindow state machine is to suppress case updates and the associated notifications caused by objects that are "flapping". That is, objects that have a status that is repeatedly changing back and forth from up and down. The functionality of the slidingWindow state machine is described in pseudo code forth below:

---
Accept "extra_info" from other state machines and update cases.
If the rate of AutoCase updates exceeds 5 in a sliding 30 minute window, suppress any more, update case saying "AutoCase updates Suppressed!"
If any new AutoCases come in during the suppressed state, hold onto the latest info.
When the rate drops below 4 per 30 minutes, update case with the last "info" and say "AutoCase updates Resumed!".

--- upsOnline State Machine

Figure 19:
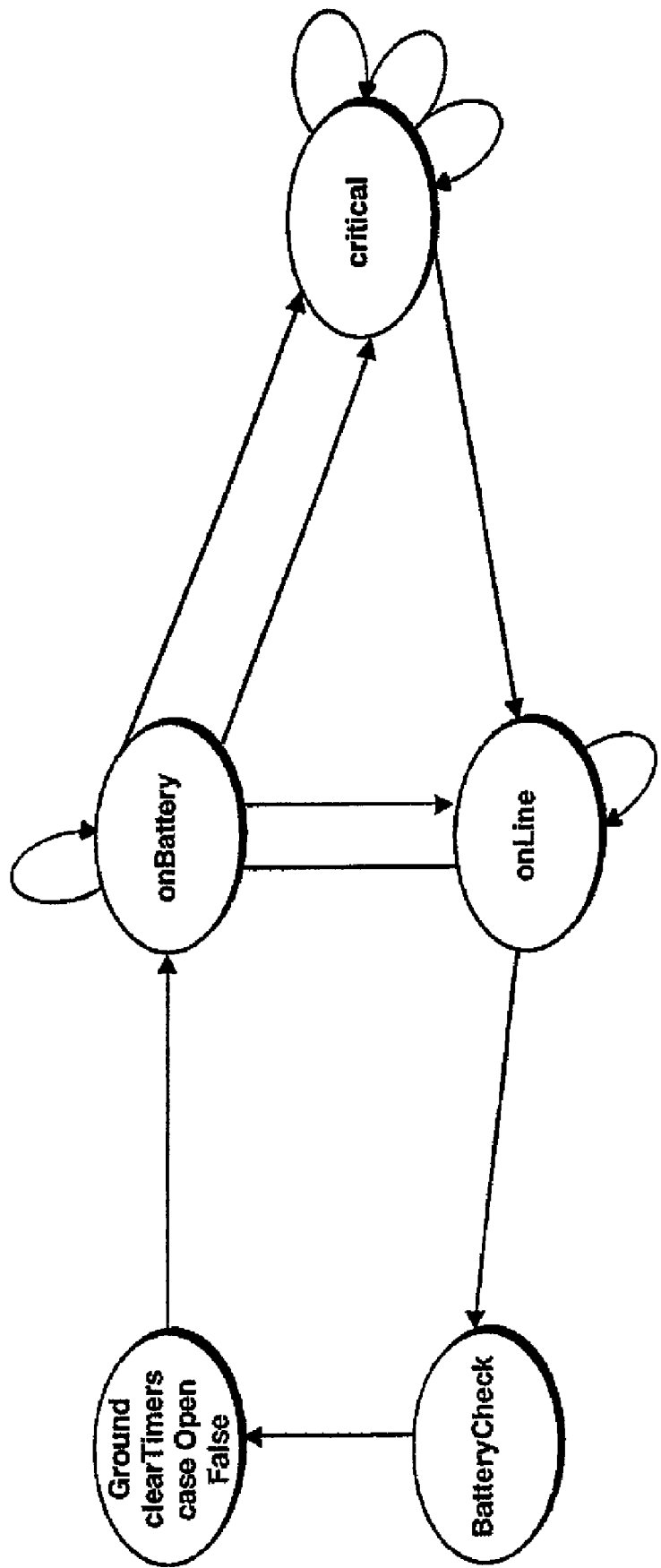

FIG. 19 illustrates the upsOnline finite state machine model 1900 supported by the illustrative embodiment of the apparatus 300. The purpose of the upsOnline state machine is to monitor the status of an uninterruptible power supply (UPS). The upsOnline State machine works in concert with the upsBattery state machine. The functionality of the upsOnline state machine is described in pseudo code forth below:

---
Accept critical "status events" from the dependency module.
Wait for up to 5 minutes to see if power will return or update case.
When power returns wait 10 minutes to make sure it is stable.
If the "status" remains critical for 10 minutes, update a case with "critical".
If the "status" remains critical for 1 hour, update case.

--- upsBattery State Machine

Figure 20:
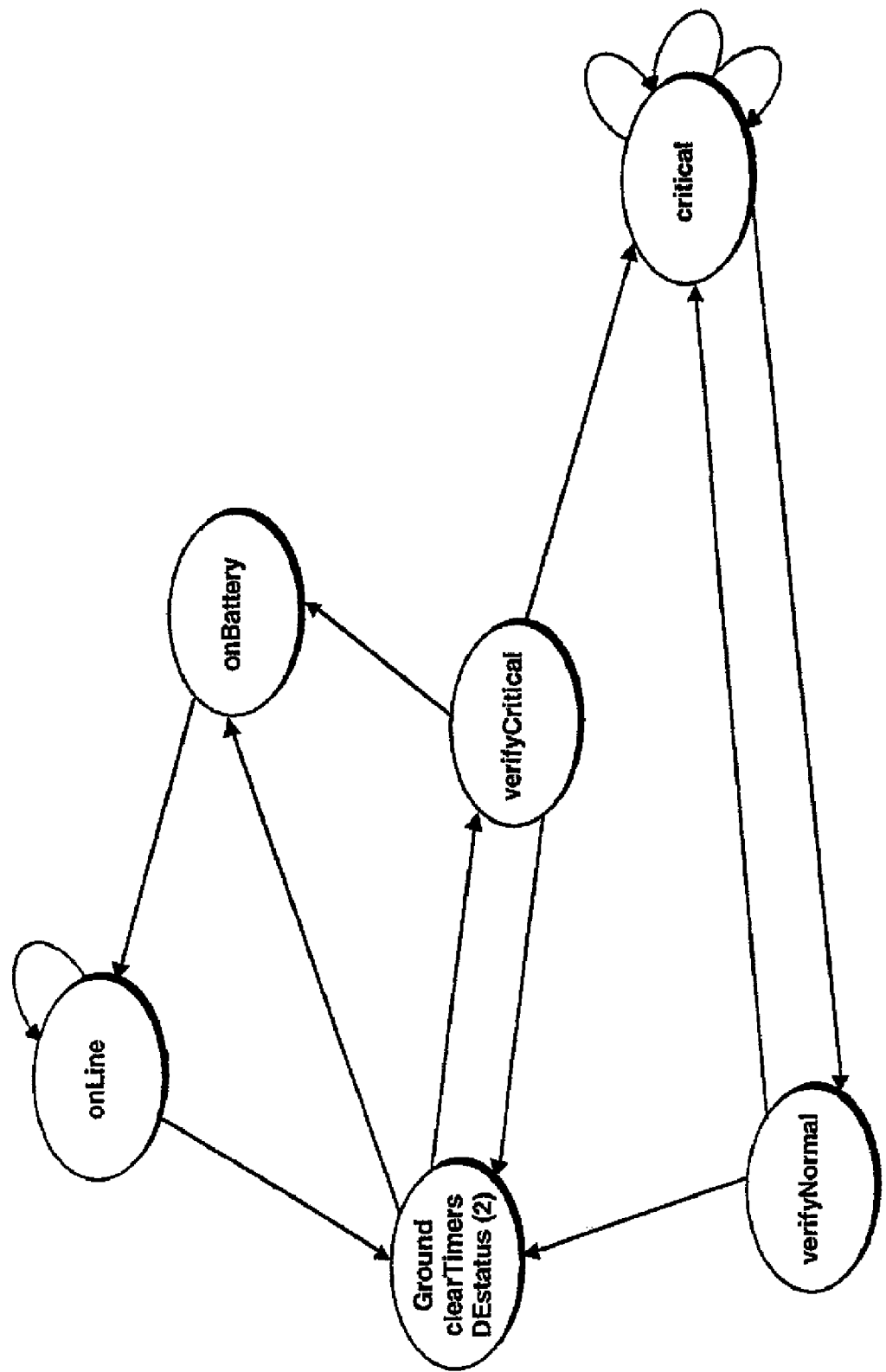

FIG. 20 illustrates the upsBattery finite state machine model 2000 supported by the illustrative embodiment of the apparatus 300. The purpose of the upsBattery state machine is to monitor the battery charge level of a UPS. The upsBattery state machine works in concert with the upsOnline state machine. The functionality of the upsBattery state machine is described in pseudo code forth below:

---
Uses object: "name:PLGN:upsBattery"
Same as noWaitVerifyStateMachine, accepts, when OnBattery (from UPS OnLine State Machine), ignore any problems with the battery. However, when the power is restored, let the UPS OnLine State Machine know when the battery is OK (charged).
Note: Destatus(n) represents 'comand (updateDEstatus.pl n), , "", ""
where (n) is the status index.

---

In addition to the upsBattery and upsOnline state machines, the remaining state machines aren't device specific. Accordingly, regardless if the device is a router, a switch, a personal computer, etc., the icmpVerify, icmpVerify, and slidingWindow state machines can be used. The inventive network appliance 300 reduces false positives through use of the state machines. When a device is first reported down, appliance 300 doesn't alert the end user that the device is down without confirmed verification. This process is done by waiting a certain amount of time and repolling the device. If the second poll shows that the device is still down, appliance 300 sends out an alert. This process of verifying statuses before reporting alarms is facilitated by the Decision Engine 334 and the state machines associated with the monitored device.

Decision Engine 334 uses the specially designed finite state machines to verify that monitored objects identified as critical by the Status Poller Module and Dependency Checker are in fact down. Decision Engine 334 then performs such functions as: Initiating detailed information in support of new case generation for the down object, or status updates to existing cases at specific time intervals for impacted objects, including device- or condition-specific messages that are provided by the state machine; updating existing cases when objects become available; and suppressing case updates for monitored objects that have exceeded a defined number of updates within a prescribed period of time.

As will be obvious to those reasonably skilled in the arts. Other state machine models may be accommodated by appliance 300 and used similarly without significant reconfiguring of the device beyond recompiling of the appropriate code segments. Extensibility is accomplished by allowing new and enhanced finite state machine models to be quickly developed and introduced without the need to change system code. For example, if a new Finite State Machine is needed because a new type of status poll has been created to better monitor or manage a specific object, the definition of this new State Machine does not require a change to the appliance 300 application software. Once the new State Machine is added to the system, any managed object that is of the new status poll type will be handled by the Decision Engine without requiring recompilation of any part of the underlying Decision Engine code. In addition, the functionality of the Decision Engine can be extended by its ability to run any program, script or utility that exists on the appliance 300 application. This function can be applied to instances such as when a process managed by appliance 300 is identified as "down", the Finite State Machine for that object can be designed to run a command that will attempt to restart the process without human intervention.

The virtual state machines provide a significant scaling advantage as compared to traditional state machines. Implementation of virtual state machines within a database solves several constraints including constraints associated with memory resident state machines implemented in RAM. With the memory constraint removed, the number of virtual state machines maintained concurrently may be increased by orders of magnitude. In addition, implementation of virtual machines in memory rather that as executing processes, allows the state data of monitored objects to be retained through a loss of power by the network appliance.

Decision Process

In terms of decision process, the Decision Engine 334 receives potential issues and supporting details following Root Cause Analysis. The defined Finite State Machine(s) for the identified objects are invoked to supplement the discovery and validation process. Based on its instructions, the Decision Engine 334 then seeks to validate the status of the device as well as other surrounding devices through the On-Demand Status Poller Module 335. The On-Demand Status Poller 335 returns status details to the Decision Engine 334 where the results are evaluated further. Once a network issue has been isolated and validated, the source of the problem and other supporting detail is passed to the Case Management system 336, which is the primary component of appliance 300's Service Management capability. Additionally, the status details relating to the root cause and devices affected through dependency are provided to the Status View Maintenance Module 385, which depicts the status in the Network Status Table and Status Maps 387. The various appliance 300 modules continue this course of action and provide updates to both cases and status indications as status conditions change.

The Status Poller polls managed objects and awaits a response within system defined parameters. Should a response not be received, the event is forwarded to the decision engine for further analysis. Concurrently, the Trap Receiver system fault trapper will collect and forward trap information to the decision engine for further analysis. The output of the decision engine is a validated problem requiring action or acknowledgement by a human operator. The decision engine uniquely identifies the problem for documentation. At a minimum the uniqueness of the problem is established by identifying the managed object effected and providing a date and time stamped description of the validated problem. The validated problem may be enhanced by further identifying the decision engine as the initiator of the problem, identifying the status of the problem, and assigning a priority to the problem. Any combination of fields within the database may be used to develop a list of problems and the order in which the problems should be addressed. For example, the database may be configured to sort and list problems by priority and date/time stamp. Thus the human technician may view a list of problems with priority one problems, sorted by age, at the top of the list. The human operator typically will document all actions taken. Actions taken will be date/time stamp and chronologically listed within the problem description along with all machine-generated information. Thus the documentation/notification engine will have recorded machine generated validated problems along with human actions within a self contained, chronological description of the problem and all actions through resolution.

The inventive appliance suppresses the generation of additional problems or cases by appending to existing problems previously identified. For example, the inventive decision engine can be configured to search for an unresolved problem previously opened by the decision engine for a specific managed object. By appending information to the existing problem the intended viewer of the problem text, i.e. the human technician, can view all machine and human generated information within its chronological context. This method significantly reduces event storms that typically inundate network management systems. Specifically, objects that continuously flap from a "known good state" to a "fault" state typically generate events associated with the transition from "known good state" to "fault" state. The inventive appliance will suppress such event storms by logically grouping all such events within one unresolved problem associated with the root cause object.

Database Tables and Field Definitions

A central relational database 352 is employed to facilitate data persistence and interprocess communication. Several processes or modules may access the same tables in the database, so the database provides a mechanism for interprocess communication. Database 352 may be implemented with any number of commercial SQL database server products, including mySQL commercially available from mySQL AB. The database server can handle a large number, e.g. 50 million records, in a single database table. In the illustrative embodiment, database 352 may include the following tables: poll, messages, current_state, state_machine, active_timers, variable_queue, command_queue, variables, transition_functions, state_functions, status_request. These tables are defined in greater detail hereinafter:

Messages Table

The message table serves as the queue for all messages used by the decision engine. All modules can place a message in the queue, but only the decision module reads messages from the queue. A message can refer to a specific object and the state machine for that object or, through the use of wildcards, multiple objects and state machines. The fields within the message table, the data type of the field and default value thereof are listed below:

```
msg_id       bigint(20) unsigned   DEFAULT '0' NOT NULL,
message      char(255)             DEFAULT '' NOT NULL,
name         char(50)              DEFAULT '' NOT NULL,
method       char(20)              DEFAULT '' NOT NULL,
instance     char(20)              DEFAULT '' NOT NULL,
extra_info   char(255)             DEFAULT '' NOT NULL,
PRIMARY KEY (msg_id)
``` current_state Table

The current_state table maintains the current state of each active state machine within the database. The fields within the current_state table, the data type of the field and default value thereof are listed below:

```
machine      char(20)   DEFAULT '' NOT NULL,
state_name   char(20)   DEFAULT '' NOT NULL,
name         char(30)   DEFAULT '' NOT NULL,
method       char(20)   DEFAULT '' NOT NULL,
instance     char(20)   DEFAULT '' NOT NULL,
KEY state_name
``` state_machine Table

The state_machine table contains state transition information for every type machine in the system. There is one record for each possible state transition for each machine type. The fields within the current_state table, the data type of the field and default value thereof are listed below:

```
machine      char(20)    DEFAULT '' NOT NULL,
state_name   char(20)    DEFAULT '' NOT NULL,
message      char(255)   DEFAULT '' NOT NULL,
target       char(20)    DEFAULT '' NOT NULL,
PRIMARY KEY (machine,state_name,message)
``` machine_definition table

The machine_definition table defines the type of machine that is to be created for a managed object based on the "method" and "instance" of the object. The fields within the machine_definition table, the data type of the field and default value thereof are listed below:

```
machine    char(20)   DEFAULT '' NOT NULL,
method     char(20)   DEFAULT '' NOT NULL,
instance   char(20)   DEFAULT '' NOT NULL,
KEY (method)
``` active_timers Table

The active_timers table serves as a queue for all requests for some kind of action on the part of the timer module. A request can refer to a specific object or, through the use of wildcards, multiple objects. Upon completion of the action and the meeting of an optional condition, a message will be placed into the message queue. The fields within the active_timers table, the data type of the field and default value thereof are listed below:

| | | |
|---|---|---|
| timer_id | bigint(20) unsigned | DEFAULT '0' NOT NULL, |
| name | char(30) | DEFAULT '' NOT NULL, |
| method | char(10) | DEFAULT '' NOT NULL, |
| instance | char(20) | DEFAULT '' NOT NULL, |
| machine | char(20) | DEFAULT '' NOT NULL, |
| arguments | char(50) | | variable_queue Table

The variable_queue table serves as the queue for all requests for some kind of action on the part of the variable module. A request can refer to a specific object or, through the use of wildcards, multiple objects. Upon completion of the action and the meeting of an optional condition, a message will be placed into the message queue. The fields within the variable_queue table, the data type of the field and default value thereof are listed below:

| | | |
|---|---|---|
| variable_id | bigint(20) unsigned | DEFAULT '0' NOT NULL, |
| name | char(30) | DEFAULT '' NOT NULL, |
| method | char(10) | DEFAULT '' NOT NULL, |
| instance | char(20) | DEFAULT '' NOT NULL, |
| machine | char(20) | DEFAULT '' NOT NULL, |
| message | char(255) | | command_queue Table

The command_queue serves as the queue for all requests for some kind of action on the part of the command module. A request can refer to specific object or, through the use of wildcards, multiple objects. Upon completion of the action and the meeting of an optional condition, a message will be placed in the message queue. The fields within the command_queue table, the data type of the field and default value thereof are listed below:

| | | |
|---|---|---|
| command_id | bigint(20) unsigned | DEFAULT '0' NOT NULL, |
| name | char(30) | DEFAULT '' NOT NULL, |
| method | char(10) | DEFAULT '' NOT NULL, |
| instance | char(20) | DEFAULT '' NOT NULL, |
| machine | char(20) | DEFAULT '' NOT NULL, | variables Table

The variables table contains the values of variables associated with a particular object that must be saved, modified, or retrieved in conjunction with a task. Examples of variables to be saved include 1) a count of the number of case updates for each managed object. It is the job of the variables module to increment, decrement or reset counters as it works off counter requests in the variable_queue. 2) the text of the last suppressed auto_open request. The fields within the variables table, the data type of the field and default value thereof are listed below:

| | | |
|---|---|---|
| name | char(30) | DEFAULT '' NOT NULL, |
| method | char(10) | DEFAULT '' NOT NULL, |
| instance | char(20) | DEFAULT '' NOT NULL, |
| machine | char(20) | DEFAULT '' NOT NULL, |
| varName | char(10) | DEFAULT '' NOT NULL, | transition_functions Table

The transition_functions table contains the list of actions that are to be performed as the result of a particular machine receiving input I (a message) while in state S. For every machine type there is a record for every possible machine state/input combination. The fields within the transition_functions table, the data type of the field and default value thereof are listed below:

| | | |
|---|---|---|
| machine | char(20) | DEFAULTs '' NOT NULL, |
| state_name | char(20) | DEFAULT '' NOT NULL, |
| input_message | char(255) | DEFAULT '' NOT NULL, |
| type | char(20) | DEFAULT '' NOT NULL, |
| action | char(20) | DEFAULT '' NOT NULL, |
| condition | char(20) | DEFAULT '' NOT NULL, |
| arguments | char(50) | DEFAULT '' NOT NULL, |
| output_message | char(255) | DEFAULT '' NOT NULL, |
| PRIMARY KEY (machine,state_name,input_message,type,action) | | | state_functions Table

The state_functions table contains the list of actions that are to be performed as the result of a particular machine "arriving" at state regardless of the input. For every machine type there will be zero or more records for each state. The fields within the state_functions table, the data type of the field and default value thereof are listed below:

| | | |
|---|---|---|
| machine | char(20) | DEFAULT '' NOT NULL, |
| state_name | char(20) | DEFAULT '' NOT NULL, |
| type | char(20) | DEFAULT '' NOT NULL, |
| action | char(20) | DEFAULT '' NOT NULL, |
| condition | char(20) | DEFAULT '' NOT NULL, |
| arguments | char(50) | DEFAULT '' NOT NULL, |
| output_message | char(50) | DEFAULT '' NOT NULL, |
| PRIMARY KEY (machine,state_name,input_message,type,action) | | | status_request Table

The status_request table serves as the queue for all requests for status polls to be performed by the on demand status poller module. The fields within the status_request function table, the data type of the field and default value thereof are listed below:

| | | |
|---|---|---|
| request_id | bigint(20) unsigned | DEFAULT '0' NOT NULL, |
| name | char(30) | DEFAULT '' NOT NULL, |
| method | char(10) | DEFAULT '' NOT NULL, |
| instance | char(20) | DEFAULT '' NOT NULL, |
| message | char(255) | DEFAULT '' NOT NULL, |
| PRIMARY KEY (request id). | | |

The illustrative embodiment of the invention has been described with an implementation using a database 352. It will be obvious to those skilled in the art the that the actual configuration of data storage components may be left to the system designer. For example, although a single database is shown, more than one database may be used, or data may be stored among a plurality of databases in distributed manner. In addition, the data described herein may be stored in traditional memory using look-up tables which contain data similar to that disclosed herein while still achieving the same results.

Wildcards in Messages

Wildcard usage is limited to the name, method and instance fields of the messages, active_timers, counter_queu, and command_queue tables. In the illustrative embodiment an asterisk (*) is used as the wildcard character, however, it will be obvious to those skilled in the arts that any number of characters may be used as acceptable wildcard characters.

The use of an asterisk in place of a specific value in a name, method, or instance field means that this message refers to all objects that match the values in the non-wildcarded fields. For example, a message with the following values:

714536493, 'moveToState (Ground)', '*', 'TCP', '*' means that the message is intended for all currently active state machines that exist for objects with the poll type of "TCP". The use of an asterisk in each of the name, method, and instance fields of a message means that the message is intended for all active machines.

User Interface

The appliance 300 includes a web server process 381 which generates a user interface which includes a number of menu selectable options and can dynamically generate a visual representation of the current state of managed objects and the Boolean relationships between objects at different layers of the Open Systems Interconnect network protocol model. In the illustrative embodiment, web server process 381 may be implemented a commercially available products such as the Apache Web server product. The dynamically generated visual representation of a managed object can scaled down to display the desired number of upstream and down stream objects from the target object, as illustrated in FIGS. 13-15 and 22. Data regarding a monitored object(s) can be viewed in the format of a Status Map or a Status View, as described hereafter.

Figure 13:
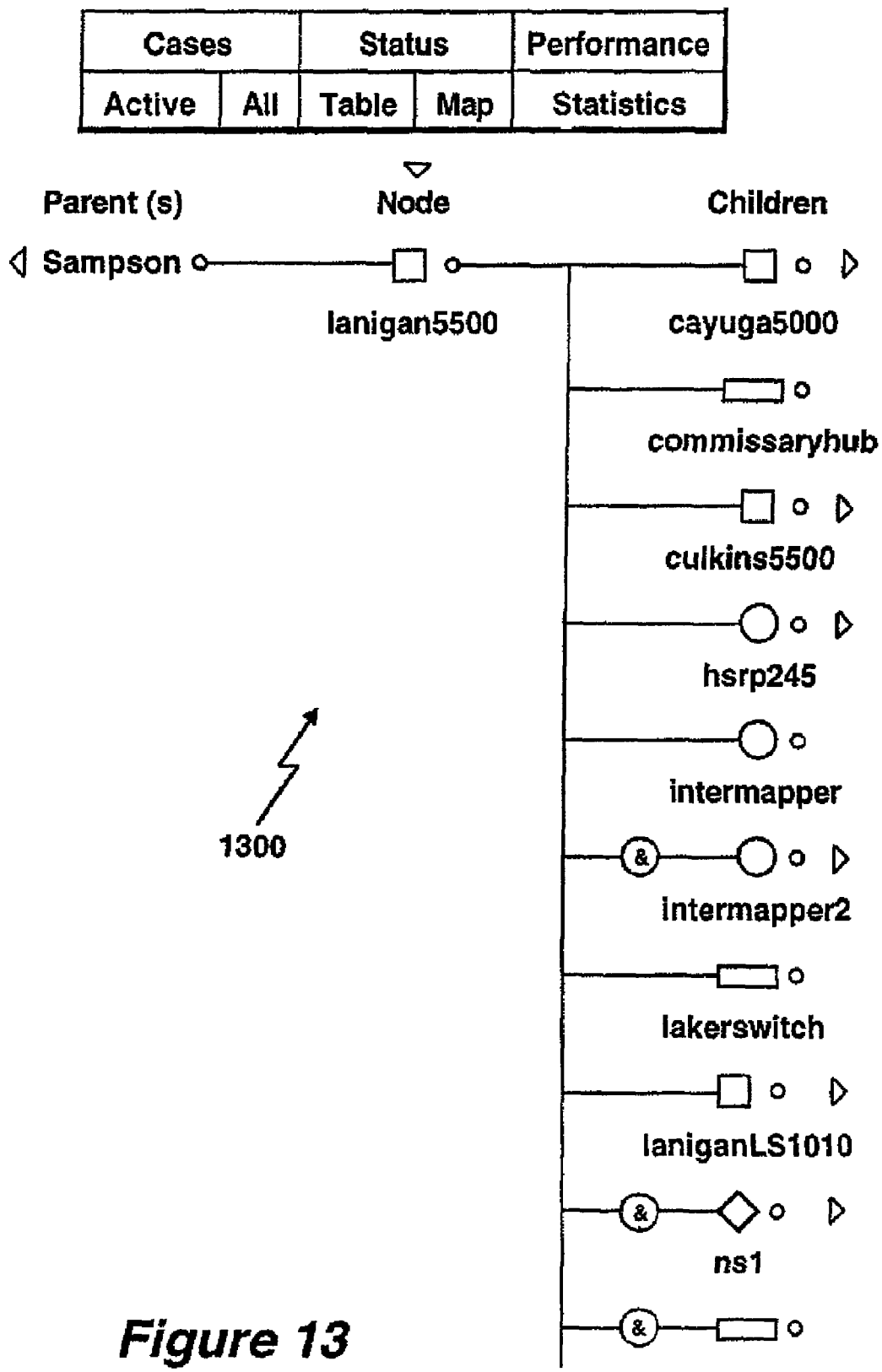
FIG. 13 illustrates a user interface diagram identifying a target monitored network device and monitored parent and child devices within the network environment in accordance with the present invention.
Figure 14:
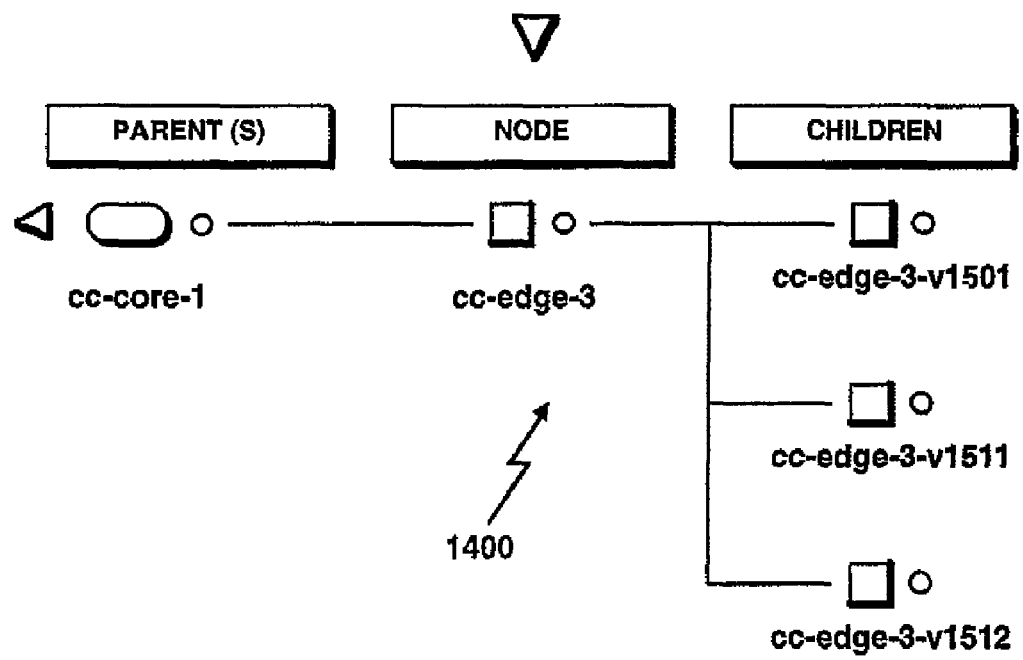
FIG. 14 illustrates a user interface diagram identifying a target monitored network device and monitored parent and child devices within the network environment in accordance with the present invention.
Figure 15:
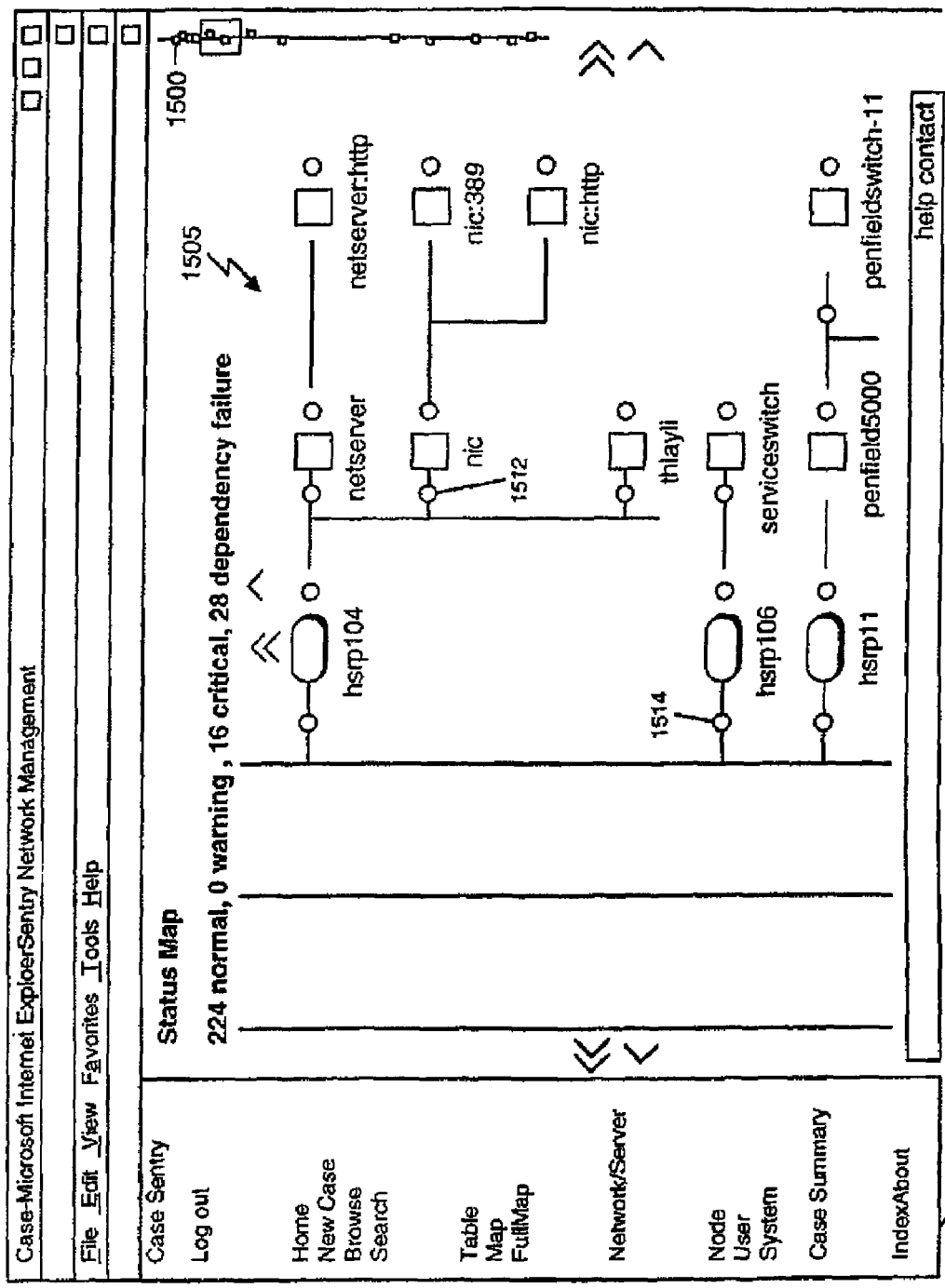
FIG. 15 illustrates a user interface status map including a microview of the network and a macroview of a selected portion of the network, in accordance with the present invention.

The diagrams illustrated in FIGS. 13-15 are generated dynamically upon request from the user. Status Table and Status Map Module 387 within appliance 300 accesses the records within database 352 to determine the upstream and downstream devices for a selected node and their relationships thereto. The Module 387 queries the portion of database 352 which maintains the virtual state machines for the selected node and its respective parent and child nodes. The diagram is then generated from this information to accurately reflect the current configuration and status of all managed objects in the conceptual diagram.

Alternatively, a map of the entire network may be generated and stored statically in database 352 or other memory and updated periodically. In this embodiment, only the selected node and its data string of managed objects (i.e., devices on which it is dependent) will be cross referenced with the virtual state machines prior to display.

Status Map

Figure 22:
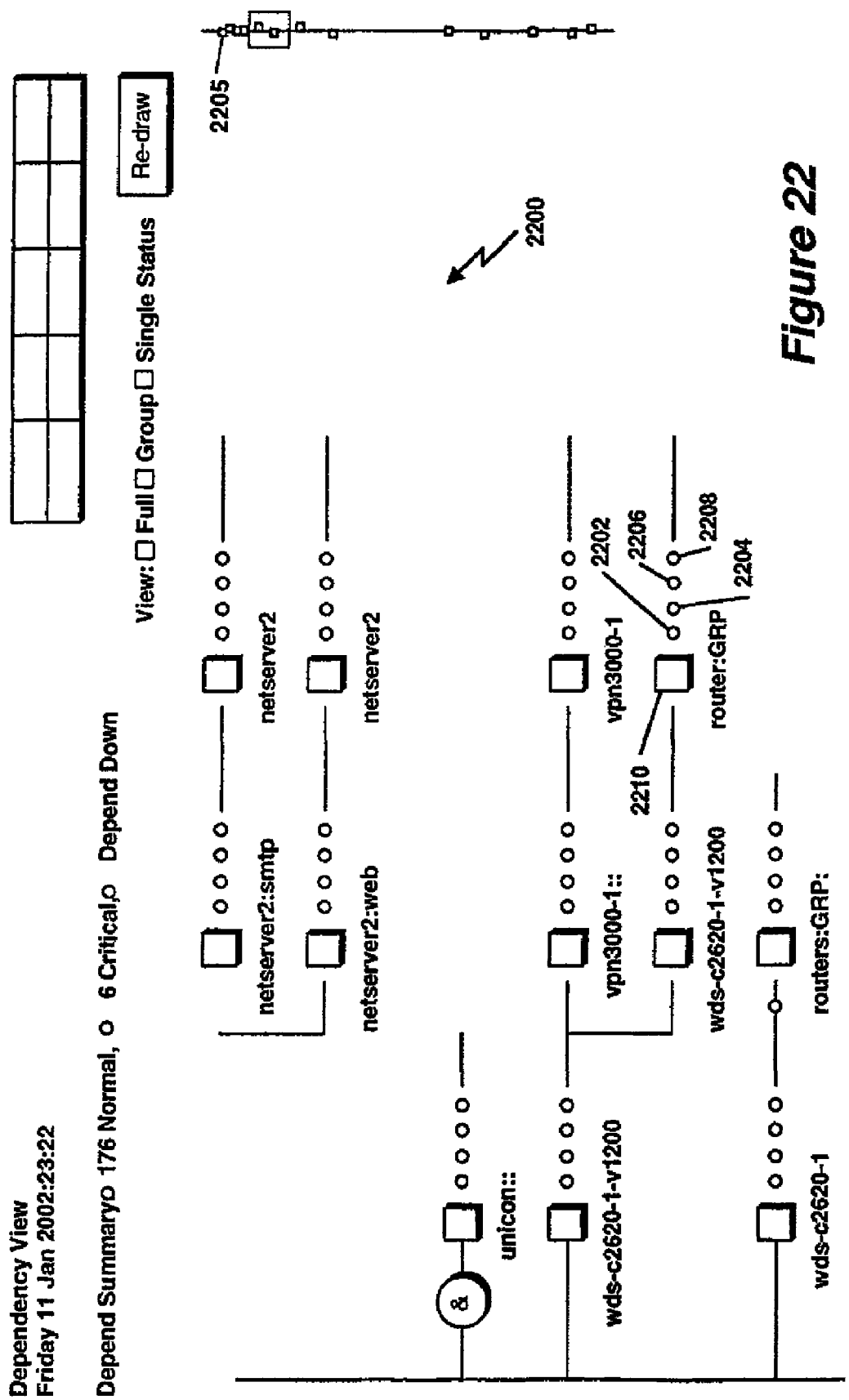
FIG. 22 illustrates a user interface status map including the dependency relationships of a target object and various status parameters for each object shown with multiple iconic representations.

As shown in FIG. 15, a web-based user interface is presented including navigation bar 1510, Status Map 1505 and a macroview graphic 1500 of the computer network being monitored. FIG. 22 illustrates a Status Map 2205 and a macroview graphic 2200, having substantially similar format to those shown in FIG. 15. A Selecting on the Map link under the Status menu on the navigation bar 1510 opens the Status Map 1505. Status Map 1505 provides a zoomed or microview physical map of the selected section of graphic 1500, designated with a box in graphic 1500. Status map 1505 shown managed objects shown in a navigable map format. Map 1505 provides a quick and easy visual guide to ascertain the network's health. A Dependency Summary, show in text form, may be provided near the top of the map indicating the number of objects in each possible status. The map view may be customized by selecting one or any combination of three options, including Pan/Full, Group/Dependency, and Single Status/All Status.

When the Status Map is opened, the top and left most section of the map is shown. This map view is referred to as the Pan mode. Navigation to other sections of the map may be performed using the single and double navigation arrows icons shown on the map. The single arrow will move the map one object to the left or right, or up and down. The double arrows will move the map one full screen either to the left or right, or up and down.

The entire Status Map 1505 may be displayed in the browser window, by selecting the View and Re-draw option commands causing the re-draw the status map to show the entire network. The horizontal and vertical scroll bars can be used to navigate to other parts of the map. To return to the Pan mode, selecting the View and Re-draw commands will cause the map to return to its default status.

By default, the Status Map opens in Dependency view, similar to Status Map 2205 shown in FIG. 22, showing physical connections between objects based on parent child relationships. When viewing the parent child dependency relationships between managed objects, the parent objects are situated to the left of child objects.

The Status Map for Groups can be viewed by checking the View check box and selecting the Re-draw button to re-draw the Status Map showing objects according to their Group affiliation. In Group mode, the context of parent-child is reversed. Since a Group cannot in itself be tested, the status of the Group (parent) is derived from its members (children). Parent Groups are to the left, and child members are to the right. The Group map depicts the relationship of various network objects in relation to how they are associated and configured in correlation to the Group. This permits monitoring by groups of like devices, location or site, or specific end-to-end processes. To return to the Dependency mode, selecting the View and Re-draw commands will cause the map to return to its default status.

Single Status/All Status

The Status Map (by default) shows you the Single Status view for all objects shown. Selecting the View and Re-draw commands will display a full complement of All Status icons (raw, dependency, decision engine and case), as shown in Status Map 2205 shown in FIG. 22. To show only the single dependency status, selecting the View and Re-draw commands again will display dependency status.

Each object in the status map may be visually depicted using icons specifically designed to provide easy recognition and visibility. Within the maps, the object's name may be listed directly underneath the icon. Next to the icon, the appropriate status may be listed in text or iconically (single status by default, all status when selected). Selecting on an object icon will return the Tools View for the respective item.

Relationship Indicators

The lines that connect one object to another indicate the relationship of an object to other objects in the network. In the illustrative embodiment, the parent objects are shown to the left and above; children objects are shown to the right and below. If groups are present in the map, appliance 300 provides information depicting the Boolean dependency expressions that have been formulated to determine what objects/nodes have an effect on determining the Group's operational status. Boolean dependency expression symbols, indicate that a Group has been created and this object is contributing to the overall determination of the Group's health and operational status. Appliance 300 allows the user to define during set-up the various individual conditions that constitute the status of a created Group.

A circle with an ampersand inside, similar to symbol 1512 of FIG. 15, indicates an 'AND' Boolean function test that is taking into consideration the operational status of individual nodes (i.e., Node A & Node B & Node C). If any of the nodes included in the expression is down, then the group status will show "down." A circle with a line through, similar to symbol 1514 of FIG. 15, means there is an 'OR' Boolean function test or expression. In such case, with multiple nodes being included in the expression (i.e., Node A or Node B or Node C), if all of the items are down, then the status for the group will show "down." An 'f' in a circle symbol is used to indicate complex expressions involving a combination of 'AND' and 'OR' Functions between the members (i.e., '[(NodeA|NodeB) & (NodeC|Node D)]' means the Group is normal if one of Node A 'OR' Node B 'AND' one of Node C 'OR' Node D is normal). No symbol bubble indicates that the Group contains only one member. There is no need to interpret these details as Appliance 300 automatically takes this logic into account when establishing a Group's status. Placing a pointing device such as a mouse pointer over any of these symbols on the network Status Maps will show you the specific details of the Boolean expression.

Network Health and Navigation Graphic

As shown in FIG. 15, in the upper-right portion of the Pan Map screen, Appliance 300 provides a small-scale version of the Status Map reflecting the entire network, referred to as a macroview or "whole" view of the network and labeled as graphic 1500. The square indicates the current location of the detail that is being shown in the main or "microview" Status Map. Selecting an area of the graphic map 1500 causes the Status Map 1505 to navigate to that portion of the network re-draw the main map at the location selected. In the contemplated embodiment, the map may be color coded to indicate which nodes or portions of the map have status other than normal, to facilitate selection thereof. Upon selecting a portion of the full network map, the user is presented with a node level diagram 1505, as illustrated in the remaining portion of FIG. 15. As shown, a selected node, as well as all other managed objects in its operational chain are illustrated conceptually, along with their status. As shown, the status of each managed object is indicated with a sphere, the color of which may indicate the status of the managed device.

Tools View

By selecting on the Tool icon or the node icons in the Status Map, the Tools View screen opens, revealing a 3-Gen map. FIGS. 13 and 14 illustrate "3-Gen" or three generation maps which display the parent and child devices to a selected object are presented and labeled accordingly. In addition, the status of the state machine for the selected node is illustrated. As with the presentation of FIG. 15, the status of each device presented in FIGS. 13 and 14 is illustrated with a sphere of changeable color. In the illustrative embodiment, green may be used to indicate a node object which is functioning properly, red may be used to indicate a node object which is non responsive or failing, other colors may be used to indicate node objects which are only partially functioning or offline, etc. It will be obvious to those skilled in the arts that other techniques may be used to represent the status of a managed object.

FIGS. 13 and 14 illustrate a Tools view of a map 1300 and 1400, respectively, that can navigated through by selecting the arrows next to the objects that are related to the object in question. The options above the map allow access to additional information about the object including case information, status information, performance information, and the ability to review any associated logs for the object. Under the Cases section, selecting the Active link will open the Case Browse screen showing all of the active cases for that object. A complete history of cases for the object, can be obtained by selecting the All link, which will open the Case Browse screen and show every case (both active and closed) for the object in question. Selecting the Table link or the Map link under the Status section opens the respective status screen, revealing the position of the object in the network. If Table is selected, the Group heading that includes the object in question opens at the top of the screen. If Map is selected, a section of the network Status Map is opened with the object in question approximately centered on the screen.

If performance graphing is provided for the object, it is directly accessible from the Tools View by selecting the Statistics link under the Performance section (only displayed if applicable) to open the MRTG graphs applicable to the object. If performance graphing is not applicable, 'n/a' (not available) will be listed under the Performance heading. Selecting the View Log link (under the Log section) will open the View Log screen. If the object open in the Tools View has associated log entries (typically process availability) for the current day, they are displayed here.

Performance polling data may be graphically depicted in various views representing each monitored performance element over different durations of time. Graphical displays are based on the ubiquitous Multi-Router Traffic Grapher (MRTG). Long duration views such as one (1) year are ideal tools for presentation of long term trending. Smaller duration views (in months, days, or hours) are useful to more precisely detect or evaluate specific anomalies or performance events that have occurred.

Performance thresholds can also be established for each performance element being monitored. Should performance levels surpass the pre-established performance baseline, appliance 300 can systematically identify and log this condition, and proceed to alert network management personnel through the integrated Case Management engine 336 and Notification engine 356.

Figure 21:
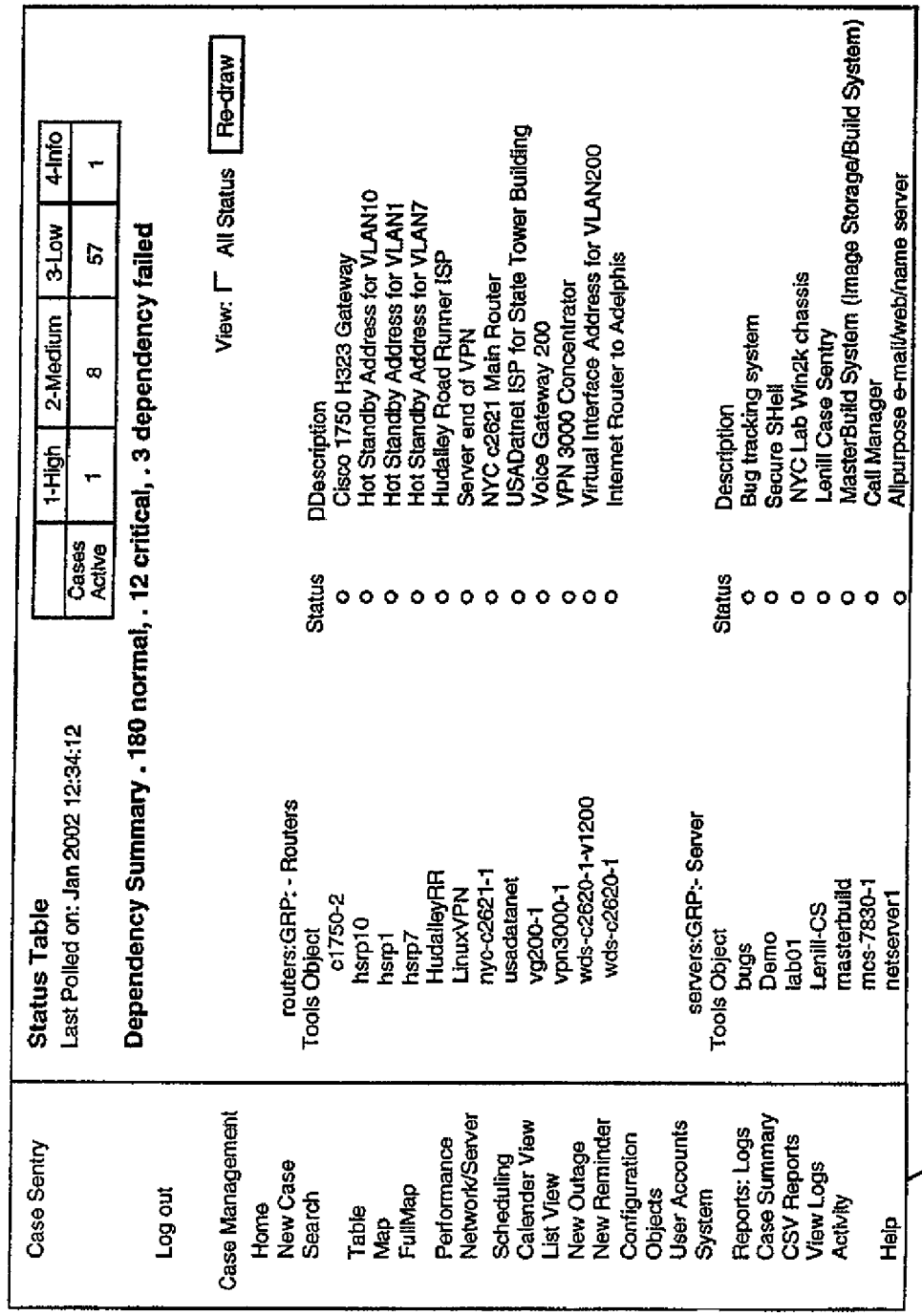
FIG. 21 illustrates a user interface status table in accordance with the present invention.

Selecting the Table link under the Status menu on the navigation bar 2110 opens the Status Table 2100, as illustrated in FIG. 21. The Status Table lists managed objects in tabular format. A Dependency Summary may be provided above the table, indicating the number of objects in each possible status. Below that, each object is listed with its current status indicated next to it. Data presented includes: Available Tools, Object Name, Status Indicator Symbols and Description.

Appliance 300 provides the option of viewing performance in either a Single Status mode that reflects object operational status, or an All Status mode that shows a more detailed view of status and processes. When this mode is selected, there are four single status indicators used within the a Status Table and Status Maps. The status icons visually depict the operational status or severity of a network problem as shown in Table 6 below:

| Status Icon | Status | Description |
| --- | --- | --- |
| Circle (Green) | Normal | Object is operational and functioning properly. |
| Circle (Yellow) | Warning | Indicates a potential problem; an object may be down. It is currently in the process of being pulled to determine its real status. |
| Circle (Red) | Critical | Object has been confirmed as down; a critical failure. |
| Circle (Blue) | Dependency Failed | Object may or may not be down; no way to determine due to a parent object or link failure. |

A dependency failure indicates that an object between the target object and Appliance 300 is not operating normally, and the status of the object in question is unknown due to its inaccessibility. By selecting the status icon for a non-dependency down object that responds to ICMP, a trace route is run between Appliance 300 and the respective object.

The architectural components of appliance 300 application detect a network's status, determine the root cause of a problem, verify operational status, and track cases pertaining to the devices, systems, services and applications. These integrated components work together to assist network management personnel identify real problems and focus their energy on efforts to manage the network.

The All Status mode provides a user with a more comprehensive view of network performance. A unique icon reflects specific information about an aspect of the appliance 300 with the color presented, thereby allowing the user to view object status as a complete process should they need additional background on the events leading to the status shown or case generation.

Table 7 below is a description of the status indicators used when All Status is reflected in the Status Map or Status Table. This information can assist in the troubleshooting and diagnostics process.

Raw Status

Such Icon Status pertains to the operation of the respective object as viewed on the Status Map or Status Table.

| Status Icon | Status | Description |
| --- | --- | --- |
| Diamond (Green) | Normal Status The object is working within normal parameters. | Testable objects have passed the last test. Group objects are not directly testable, however their raw status status is evaluated by the Boolean expression of the raw status of the members in the group. Simple relationships can indicate that "any" or "all" of the members are "normal." Complex relationships follow the simple Boolean rules. Typically, no action is required. However, there may be tools available for these objects that can help find clues about critical objects. Compare raw status color to dependency and decision engine color. |
| Diamond (Red) | Critical Status The object is not working within normal parameters. | Testable objects have failed the last test. Look for the root cause to start the troubleshooting process. Group objects are not directly testable, however their raw status status is evaluated by the Boolean expression of the raw status of the members in the group. Simple relationships can indicate that "any" or "all" of the members are "critical." Complex relationships follow the simple Boolean rules. |

Dependency Status

Status of objects that may have been impacted through dependency relationship.

| Status Icon | Status | Description |
| --- | --- | --- |
| Circle (Green) | Normal Status The object is working within normal parameters. | Typically, no action is required. |
| Circle (Red) | Root Cause The object is a root cause. Group objects: the root cause of the problem is within its members. | Testable objects have failed, and there are no failed parents. Wait for the decision engine to verify the status and open a case before starting the troubleshooting process. For group objects: Look for the root cause within its members. |
| (Blue) | Dependency Failed Parent has failed. Group objects: the root cause is not one of the members. | Wait for the decision engine to verify the status and open a case before starting the troubleshooting process. |

Decision Engine Status

Status of current operation of the Decision Module as it relates to analyzing the specific object.

| Status Icon | Status | Description |
| --- | --- | --- |
| Triangle (Green) | Ground State There are no active State Machines for this object. | No action is required unless it is determined that a Finite State Machine should be running. |
| Triangle (Red) | Verified Critical State Machine is active. It is verifying or has verified the status. | Watch for the case priority icon to see if the event has led to a case being generated. |

Case Priority

Status indicates the presence of active cases for the object, including the priority as currently assigned to the case. If active cases are present, the user can click on the case icon and they will be routed to the Search Results screen where the case can be accessed.

| Status Icon | Status | Description |
| --- | --- | --- |
| Square (Green) | No Active Cases There are no active cases for this object. | No action is required unless other status icons indicate that there should have been a case generated. |
| Square (Blue) | Informational Case Active Manual or AutoCase has been set to Info priority. | Read the case and take action as applicable. |
| Square (Yellow) | Low Priority Case Active Manual or AutoCase has been set to low priority. | Read the case. If applicable, verify that object is normal and close the case. |

-continued

| Status Icon | Status | Description |
|---|---|---|
| Square (Orange) | Medium Priority Case Active Manual or AutoCase has been set to medium priority. | Read the case. If applicable, work on this if there are no high priority cases to work on. |
| Square (Red) | High Priority Case Active Manual or AutoCase has been set to high priority. | Read the case. If applicable, the case should be worked on ASAP to troubleshoot and correct the issue. |

Placing a pointing device cursor over a status icon in a Status Map or Status Table generates a hint box that provides a description of the status as set forth in Table 8 below. The values may be any of the following:

| | |
|---|---|
| Diamond (Green) | Raw Status: normal |
| Diamond (Red) | Raw Status: critical |
| Circle (Green) | Dependency: normal |
| Circle (Red) | Dependency: root cause |
| Circle (Blue) | Dependency: dependency failed |
| Triangle (Green) | Decision Engine: normal |
| Triangle (Red) | Decision Engine: critical |
| Square (Green) | Case Management: no active cases |
| Square (Blue) | Case Management: info case active |
| Square (Yellow) | Case Management: low priority case active |
| Square (Orange) | Case Management: medium priority case active |
| Square (Red) | |

Referring again to FIG. 22, an All Status view 2200 of a monitored object 2210 includes multiple status icons 2202, 2204, 2206, and 2208, in accordance with the description herein. The other managed objects within the view 2200 have similar status icons.

Groups

Appliance 300 allows a collection of monitored objects to be depicted as a Group. The Group is represented as an object, and it is dependent upon its member objects to determine the Group's status. The Group is then displayed as a standard object icon on all relevant maps. Additionally, Group objects are represented on group status maps and tables that depict the relationship of member objects to the Group.

Selecting a Group object from the Group Status Maps or Status Table will cause the display of an abbreviated map, which contains the Tools View for the Group object. Group members may be defined in the same manner as other object dependency strings. However, when a Group's status becomes dependency failure, an inference can be made as to the source of the problem.

Consider the example in which a site has three Uninterrupted Power Sources (UPSs) being monitored. The power supply may be modeled as a Group by creating a Group object, and adding 'OR' dependencies to all three of the UPSs. In this way, when all three UPSs fail at the same time, the status of the Group object will go show dependency failure, signifying a strong possibility that the entire site has lost power.

The All Status states of a Group object are:
  Raw Status (Diamond Icon)
    Bad/Red—Member object's raw status caused Group's dependency expression to show "Failed" (depend down).
    Good/Green—Member object's raw status translates to good based on expressions established (Group's dependency expression shows "Up").
  Dependency Status (Circle Icon)
    Bad/Red—This Group's member objects are considered the "root cause" of the failure(s) occurring.
    Bad/Blue—This Group is dependency down, and the root cause for failure(s) is not among the Group's members.
    Good/Green—Member object's status is good.
  Decision Engine Status (Triangle Icon)
    Red—This Group is being processed by the Decision Engine (is not in "Ground State").
    Green—This Group is in "Ground State" in the Decision Engine.
  Case Status (Square Icon)
    Red—High priority AutoCase exists for this Group.
    Orange—Medium priority AutoCase exists for this Group.
    Yellow—Low priority AutoCase exists for this Group.
    Blue—Information Case exists for this Group.

The user interface described above is a web based user interface. It will be obvious to those skilled in the arts that other user interface formats, such as one compatible with the many version of the Windows operating system may be equivalently used with the present invention with the same results.

From the foregoing description and attached figures, the reader will appreciate that the present invention provides a device which is capable of monitoring the status of complex networks of devices or processes, providing information regarding the status of the network or a specific device through a plurality of different communication channels and displaying accurate visual representations of a node and its immediate relationships in the network, in a manner which is both intuitive and efficient.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the disclosure herein and any claims deriving priority from the same.

What is claimed is:

1. A computer program product for use with a computer system operatively coupled over a computer network to a plurality of device or process objects, the computer program product comprising a computer readable storage medium having program code embodied thereon comprising:
  a) program code for monitoring the status of the plurality of monitored objects over the computer network;
  (b) program code for receiving data indicating that the status of a monitored objects, and, if the data indicating that the status of a monitored object is not normal, for sending a verification request to the monitored object requesting verification of abnormal status and for receiving from the monitored object data confirming or denying abnormal status thereof;

(c) program code for storing, in a memory, data relating to the status of the monitored objects wherein the memory stores a plurality of virtual state-machines relating to the monitored objects; and (d) program code for presenting data relating to the monitored objects.

2. An apparatus for use with a computer system operatively coupled over a computer network to a plurality of device or process objects, some of the plurality of objects having dependency relationships therebetween, the apparatus comprising:

(a) a display device;

(b) a memory coupled to the display device;

(c) program logic for monitoring the status of the plurality of monitored objects;

(d) program logic for receiving data indicating that the status of a monitored object, and, if the data indicating that the status of the monitored object is not normal, for sending a verification request to the monitored object requesting verification of abnormal status and for receiving from the monitored object data confirming or denying abnormal status thereof;

(e) program logic for storing, in the memory, data relating to the status of the monitored objects;

(f) program logic for receiving a request to display the status of one of the monitored objects;

(g) program logic for simultaneously presenting, on the display device, a macroview visual representation of the computer network and a microview visual representation of a node-level map of a designated portion of the macroview visual representation.

3. In a computer system operatively coupled over a computer network to a plurality of device or process objects, a method comprising:

(a) monitoring the status of the plurality of monitored objects over the computer network;

(b) receiving data indicating that the status of a monitored object, and, if the data indicating that the status of the monitored object is not normal, sending a verification request to the monitored object requesting verification of abnormal status and for receiving from the monitored object data confirming or denying abnormal status thereof;

(c) storing in memory data relating to the status of the monitored object; and (d) presenting a visual representation of the monitored object, and a current state of a plurality of parameters associated with the status of the monitored object, the current state of the plurality of parameters represented as a visual icon.

4. The method of claim 3 wherein (d) comprises:

(d1) representing dependency relationships of the monitored object to others of the monitored objects in the computer network with indicators of Boolean relations.

5. The method of claim 4 wherein (d) further comprises:

(d2) presenting a visual representation of any child monitored object which depends directly from the requested monitored object and a current state of any said child monitored object.

6. The method of claim 5 wherein (d) further comprises:

(d2) presenting a current state of a plurality of parameters associated with the status of a child monitored object, the current state of the plurality of parameters represented as a visual icon.

7. The method of claim 4 wherein (d) further comprises:

(d2) presenting a visual representation of any parent monitored object on which the requested monitored object depends directly and a current state of any said parent monitored object.

8. The method of claim 7 wherein (d) further comprises:

(d2) presenting a current state of a plurality of parameter associated with the status of a parent monitored object, the current state of the plurality of parameters represented as a visual icon.

* * * * *